(12) United States Patent
Medborg

(10) Patent No.: US 12,439,903 B2
(45) Date of Patent: Oct. 14, 2025

(54) SYSTEM FOR ANGLING

(71) Applicant: MEDBORG HOLDING APS, Skibby (DK)

(72) Inventor: André Bengt Medborg, Skibby (DK)

(73) Assignee: MEDBORG HOLDING APS, Skibby (DK)

( * ) Notice: Subject to any disclaimer, the term of this patent is extended or adjusted under 35 U.S.C. 154(b) by 0 days.

(21) Appl. No.: 18/273,376

(22) PCT Filed: Jan. 19, 2022

(86) PCT No.: PCT/EP2022/051062
§ 371 (c)(1),
(2) Date: Jul. 20, 2023

(87) PCT Pub. No.: WO2022/157165
PCT Pub. Date: Jul. 28, 2022

(65) Prior Publication Data
US 2024/0090485 A1 Mar. 21, 2024

(30) Foreign Application Priority Data
Jan. 21, 2021 (DK) .......................... PA 2021 00062

(51) Int. Cl.
*A01K 91/03* (2006.01)
(52) U.S. Cl.
CPC ................... *A01K 91/03* (2013.01)
(58) Field of Classification Search
CPC ...... A01K 91/03; A01K 91/04; A01K 85/029; A01K 85/011; A01K 85/012;
(Continued)

(56) References Cited

U.S. PATENT DOCUMENTS 1,771,125 A * 7/1930 Kahle .................... A01K 91/03
24/116 R
2,720,720 A * 10/1955 Landrum ............... A01K 93/00
43/43.11
(Continued)

FOREIGN PATENT DOCUMENTS

| KR | 100734559 B1 | 7/2007 |
|---|---|---|
| WO | 2006137103 A1 | 12/2006 |
| WO | 2020041840 A1 | 3/2020 |

OTHER PUBLICATIONS

International Search Report Forms ISA 210, 220, 237 for PCT/EP2022/051062 issued on Apr. 19, 2022.
(Continued)

*Primary Examiner* — William L Gmoser
(74) *Attorney, Agent, or Firm* — Nath, Goldberg & Meyer; Joshua B. Goldberg

(57) ABSTRACT

The invention relates to a system for angling, said system comprising, at least a first unit and a second unit, which when assembled forms a part of an angling gear, characterized by, said system comprising, a releasable snap coupling assembly that can lock the first and the second units together. The system may comprise a first and a second unit, which when assembled forms a part of an angling gear with an enclosure in which a line can be mounted in such a way that the units can slide on the line in the longitudinal direction of the line. The first unit comprises a groove in which the line can be laid. The second unit comprises a portion made complementary to the groove such that the enclosure is created when the first and the second units are assembled. The system comprises a releasable snap coupling assembly that can lock the first and the second units together.

9 Claims, 26 Drawing Sheets

(58) Field of Classification Search
CPC .. A01K 85/013; A01K 85/00; A01K 85/1867; A01K 85/1851; A01K 85/1853; A01K 85/1871; A01K 85/1881; A01K 85/1837; A01K 85/18; A01K 95/02; A01K 95/00; A01K 93/00
USPC .......... 43/42.09, 42.32, 42.33, 42.34, 42.39, 43/44.95, 44.92, 44.91, 42.49, 42.36, 43/42.15, 42.11, 42.05
See application file for complete search history.

(56) References Cited

U.S. PATENT DOCUMENTS

| | | | | |
|---|---|---|---|---|
| 3,204,363 | A * | 9/1965 | Dunham | A01K 93/00 43/44.88 |
| 3,284,944 | A * | 11/1966 | Settle | A01K 85/18 43/42.15 |
| 3,353,294 | A * | 11/1967 | Mundorff | A01K 93/00 43/44.88 |
| 3,455,056 | A * | 7/1969 | Samuel | A01K 93/00 43/44.91 |
| 3,675,358 | A | 7/1972 | Jones | |
| 3,791,064 | A | 2/1974 | Van Iseghem, Jr. | |
| 3,913,257 | A * | 10/1975 | Colgan | A01K 85/16 43/42.09 |
| 4,125,958 | A * | 11/1978 | Cote | A01K 91/04 43/43.12 |
| 4,251,941 | A * | 2/1981 | Howard | A01K 93/00 43/43.11 |
| 4,616,441 | A * | 10/1986 | Dmytriw | A01K 93/00 43/44.91 |
| 4,926,580 | A * | 5/1990 | Lin | A01K 91/03 43/43.12 |
| 5,157,861 | A * | 10/1992 | Peterson | F16B 3/00 24/669 |
| 5,557,878 | A * | 9/1996 | Ross | A01K 91/20 43/43.11 |
| 5,911,571 | A * | 6/1999 | Wittbrot, III | A01K 85/18 43/42.15 |
| 5,926,993 | A | 7/1999 | Marusak et al. | |
| 6,125,574 | A * | 10/2000 | Ganaja | A01K 91/03 24/136 L |
| 6,718,684 | B2 * | 4/2004 | Yong-Set | A01K 85/16 43/42.39 |
| 7,481,020 | B1 * | 1/2009 | Ruzicka | A01K 93/00 43/44.87 |
| 9,370,174 | B2 * | 6/2016 | Farley | A01K 93/00 |
| 9,655,353 | B1 | 5/2017 | Hudson et al. | |
| 9,867,365 | B1 * | 1/2018 | Rosenbloom | A01K 95/02 |
| 10,729,106 | B2 * | 8/2020 | McConnell | A01K 27/005 |
| 2009/0090039 | A1 | 4/2009 | Ross | |
| 2009/0300967 | A1 | 12/2009 | Rainey | |
| 2011/0107653 | A1 | 5/2011 | Tsai | |
| 2016/0007581 | A1 * | 1/2016 | Davidson | G02B 13/06 359/809 |
| 2022/0279769 | A1 * | 9/2022 | Douglas | A01K 93/00 |

OTHER PUBLICATIONS

Communication Pursuant to Article 94(3) EPC dated Jul. 11, 2025 corresponding to European application No. 22701214.3-1105.

* cited by examiner

Fig. 2
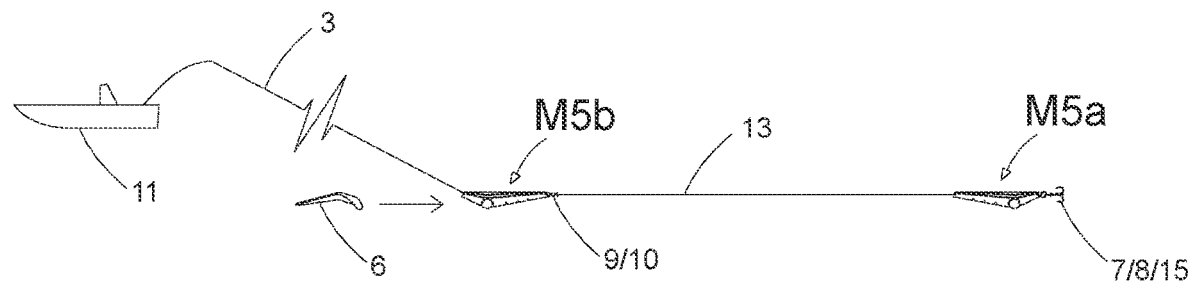
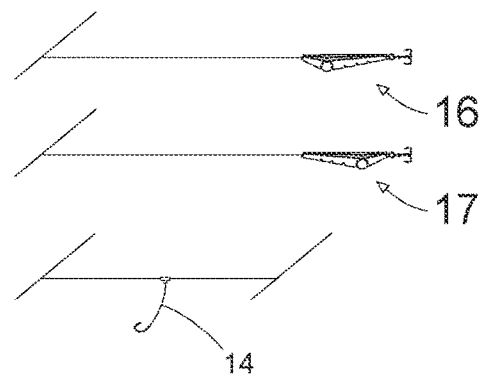
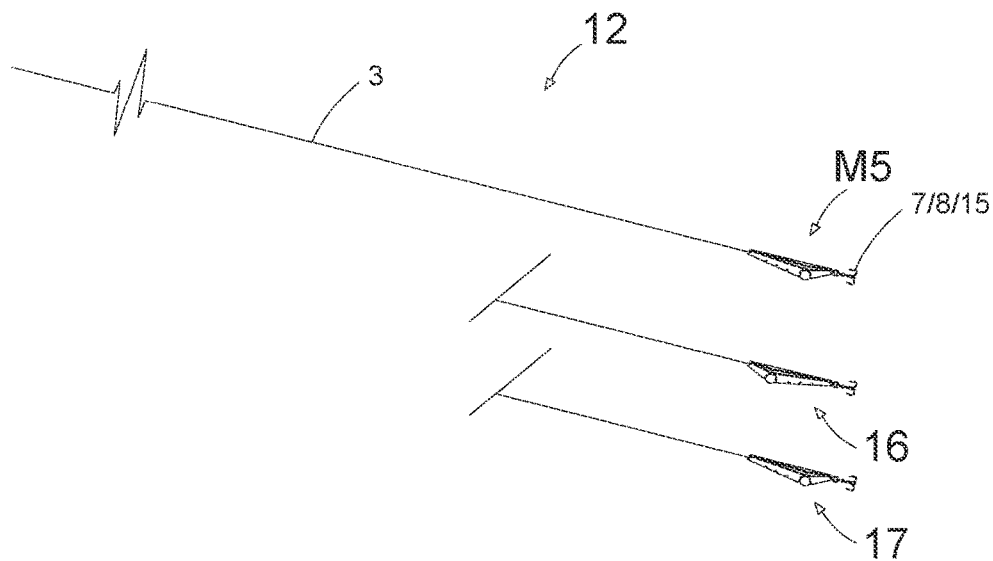
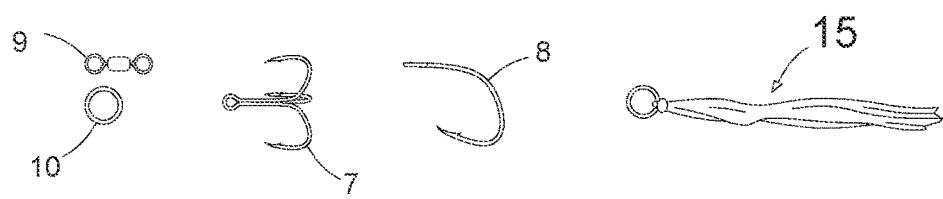

Fig. 8
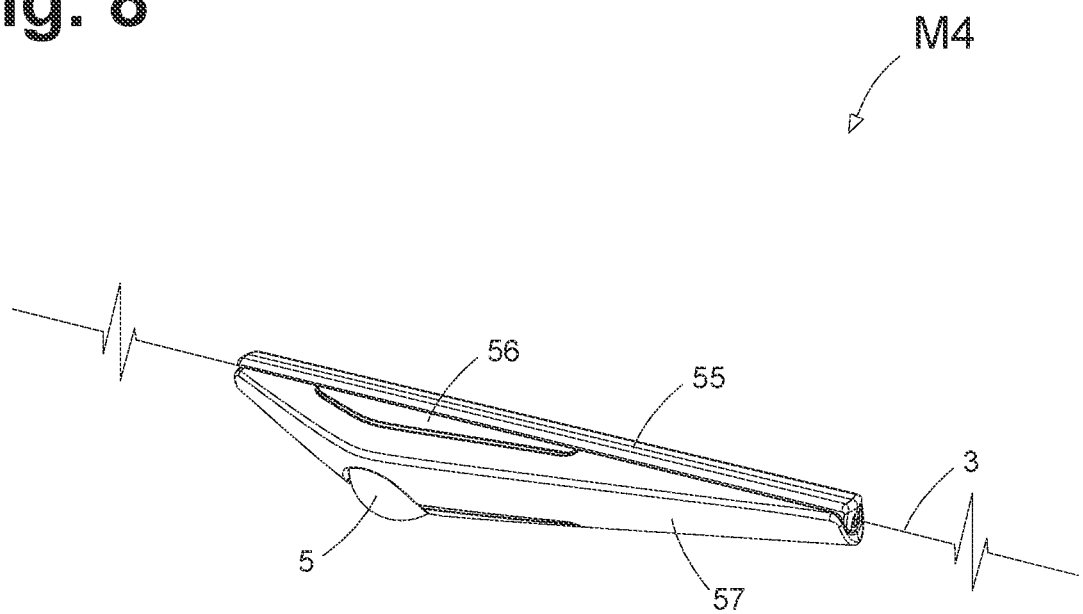
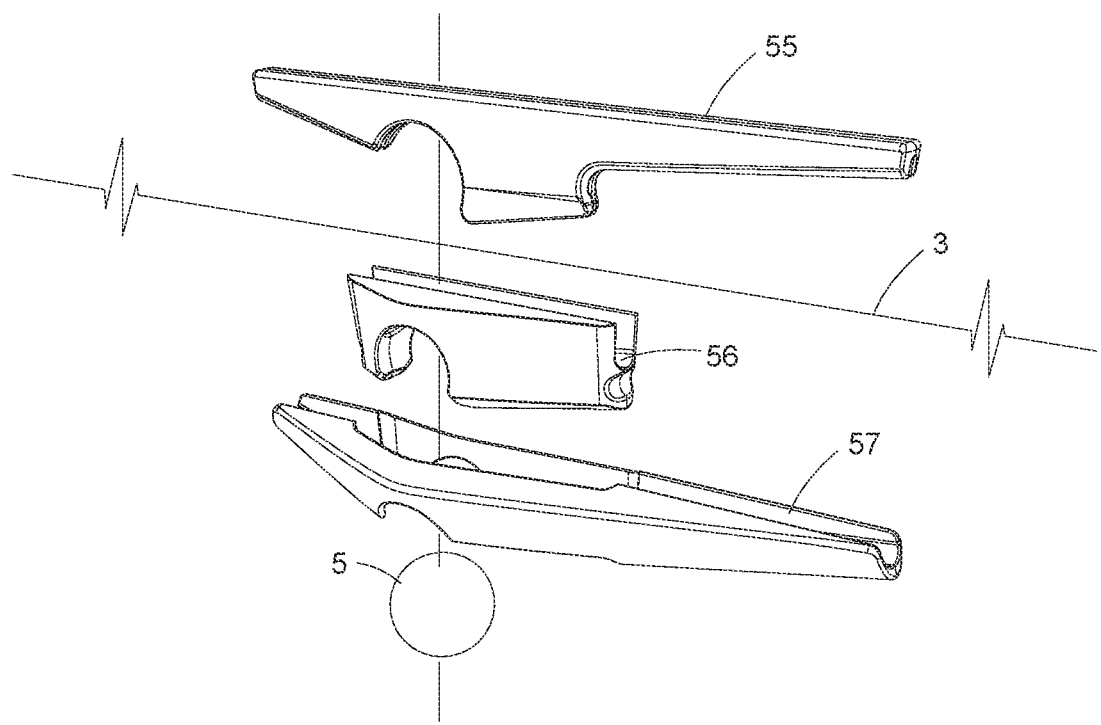

Fig. 9
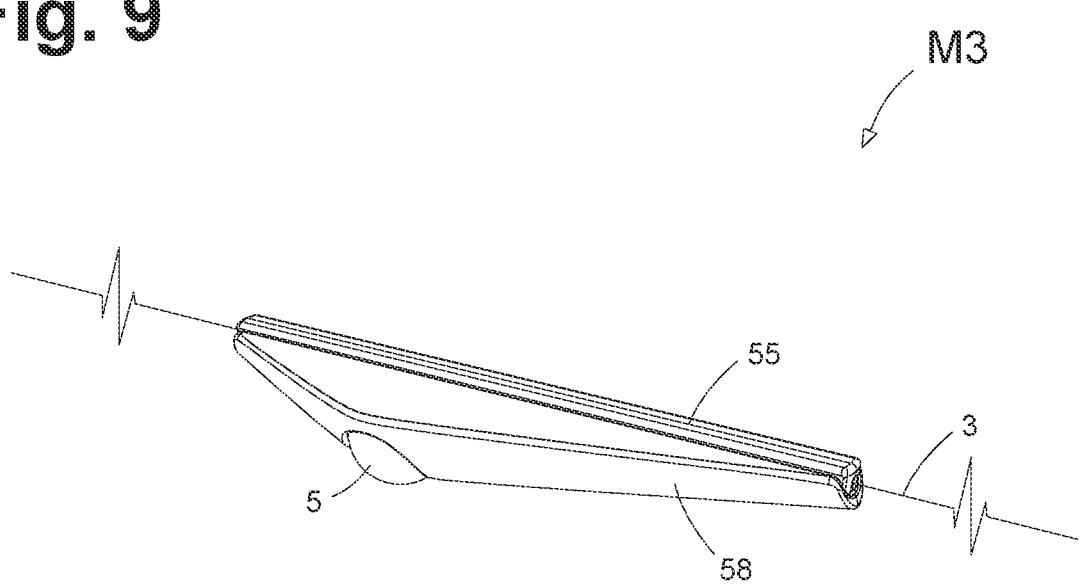
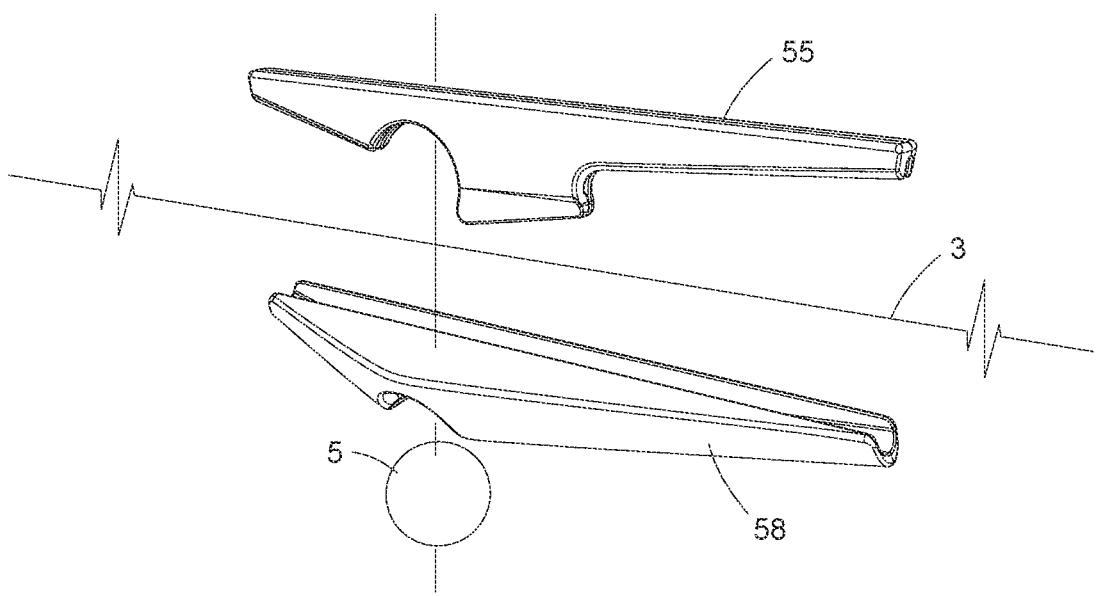

Fig. 10
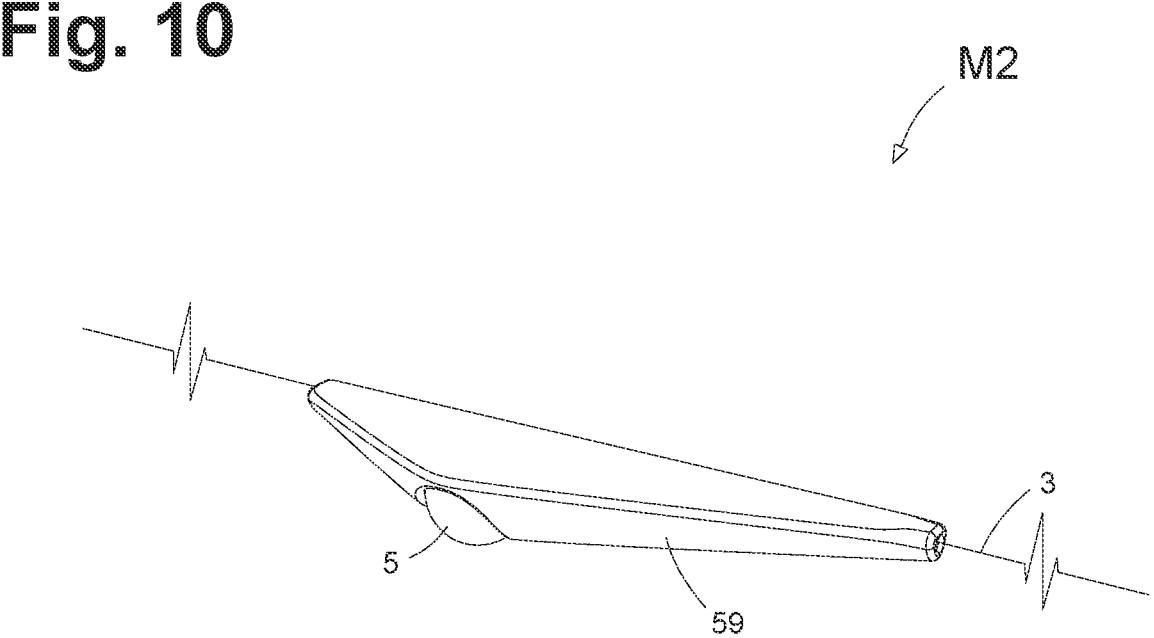
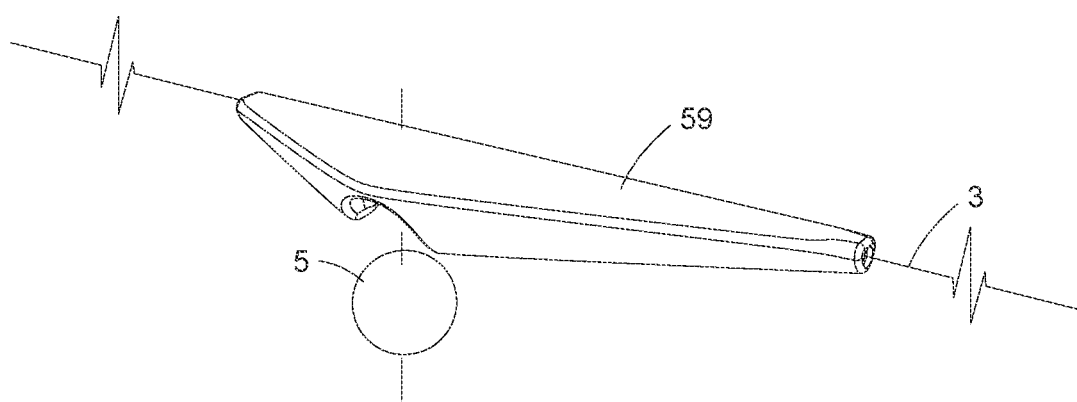

Fig. 11
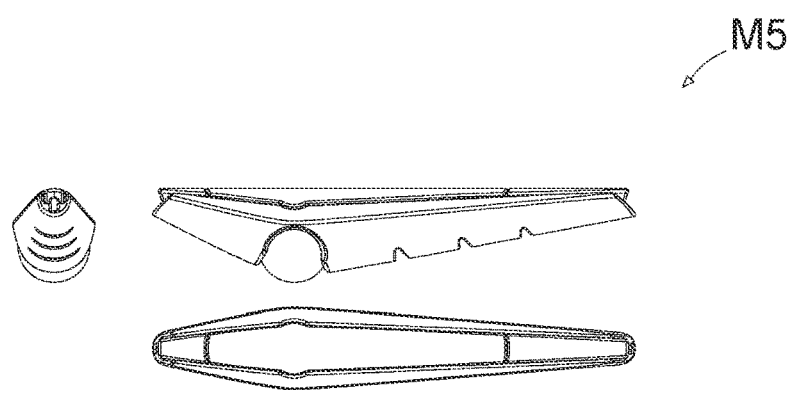
M5
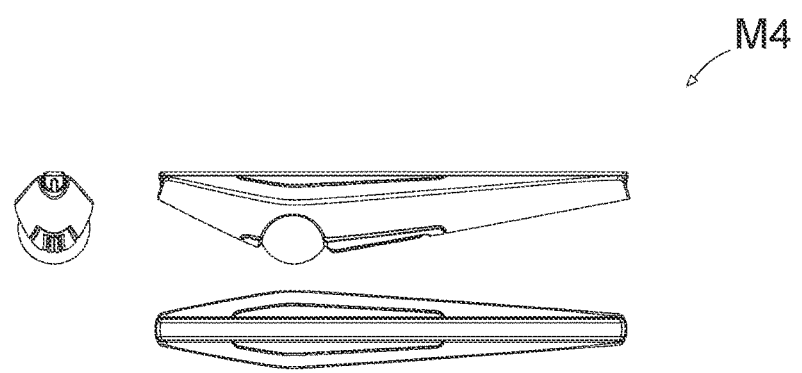
M4
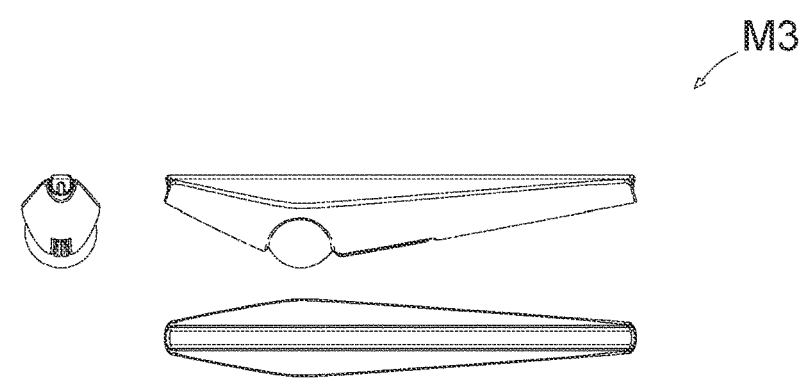
M3
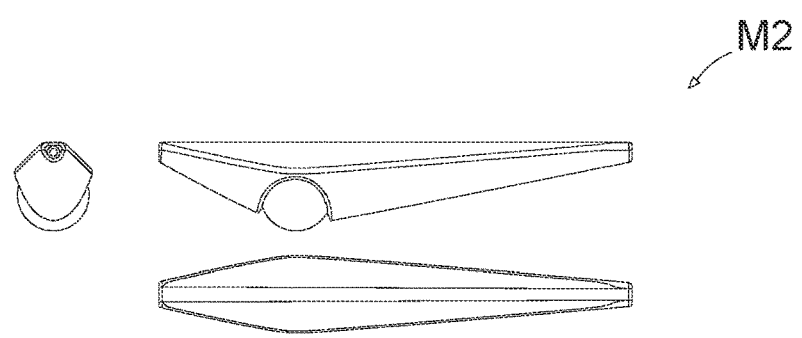
M2

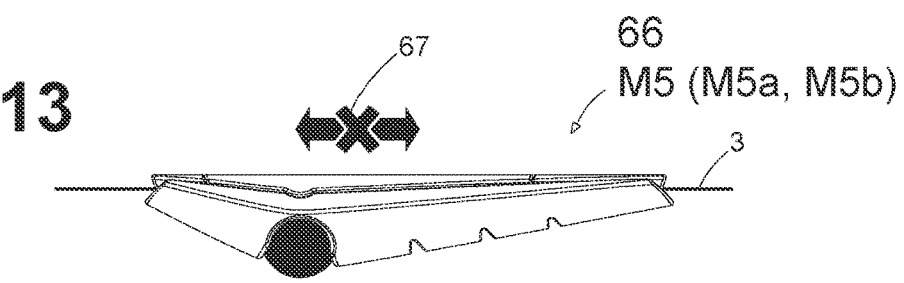
Fig. 13
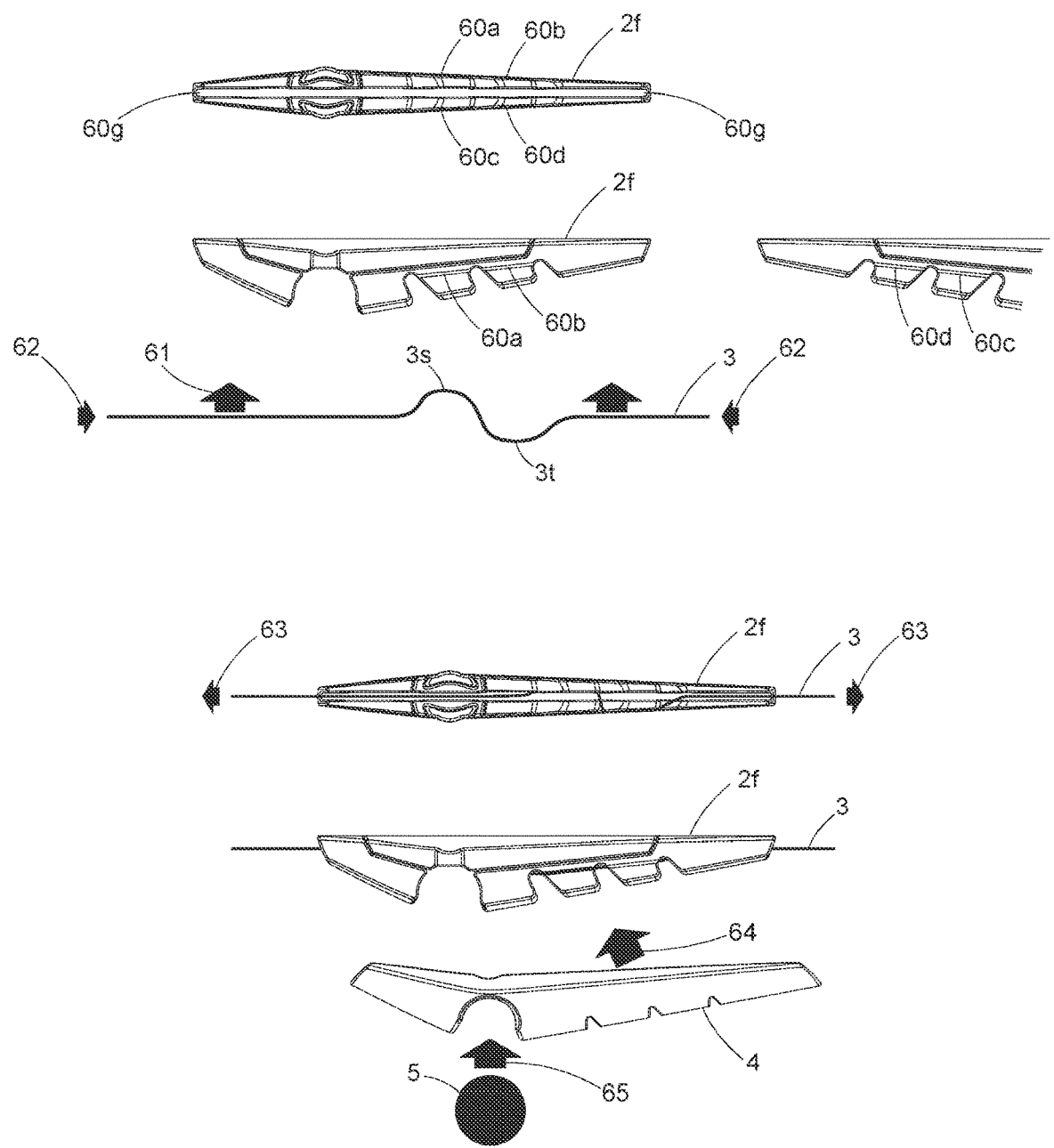

Fig. 15
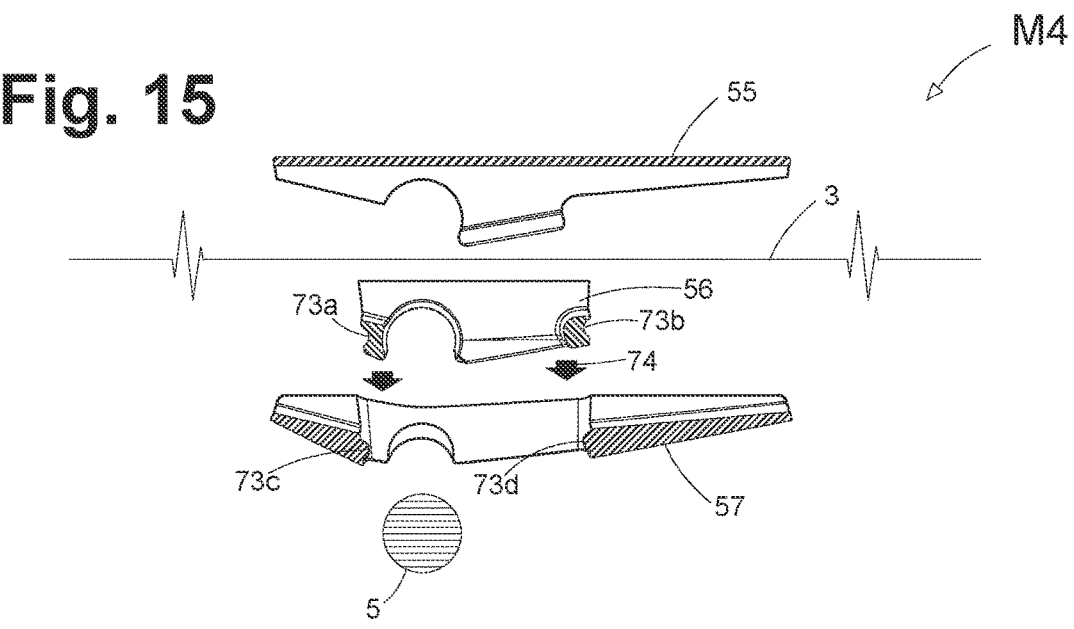
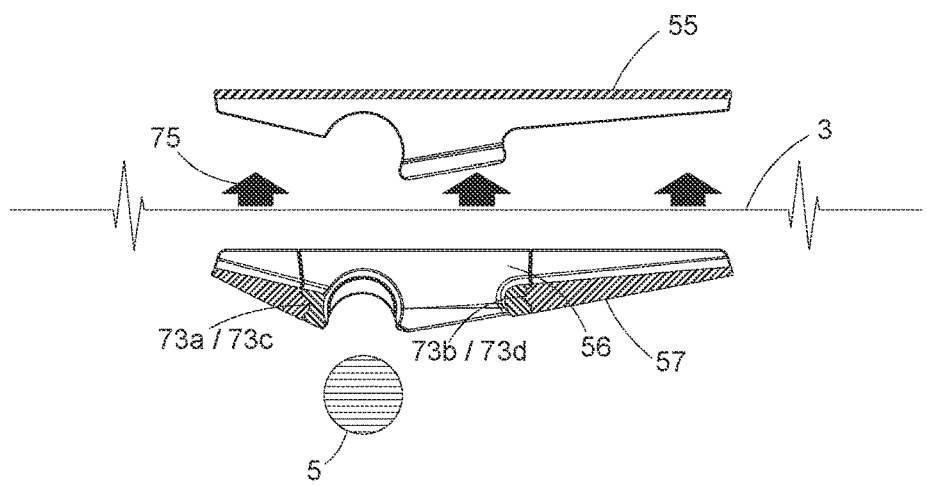
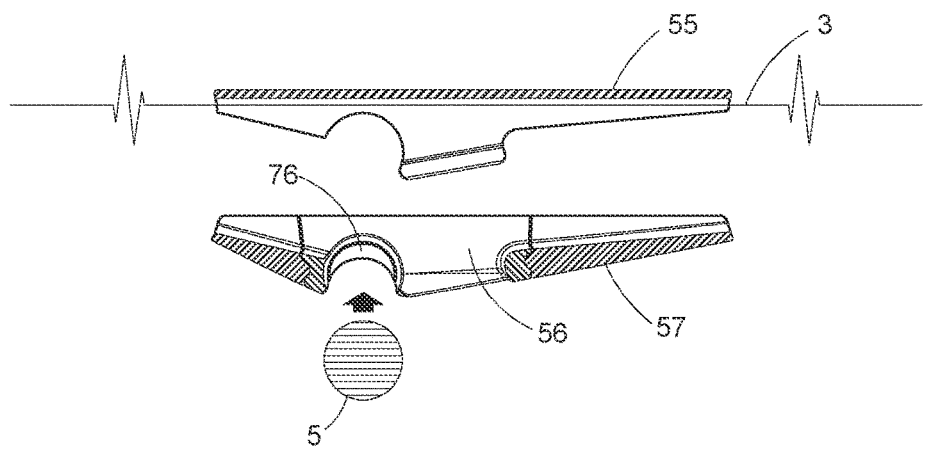

Fig. 16
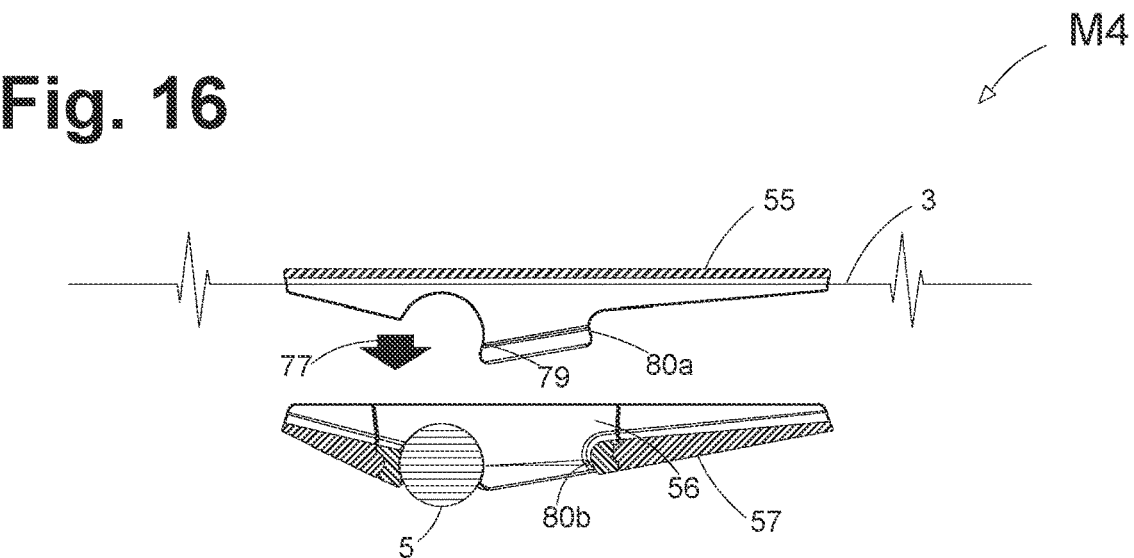
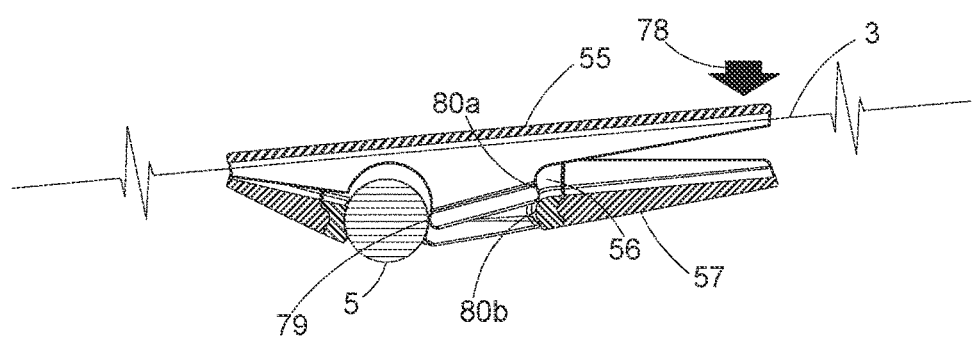
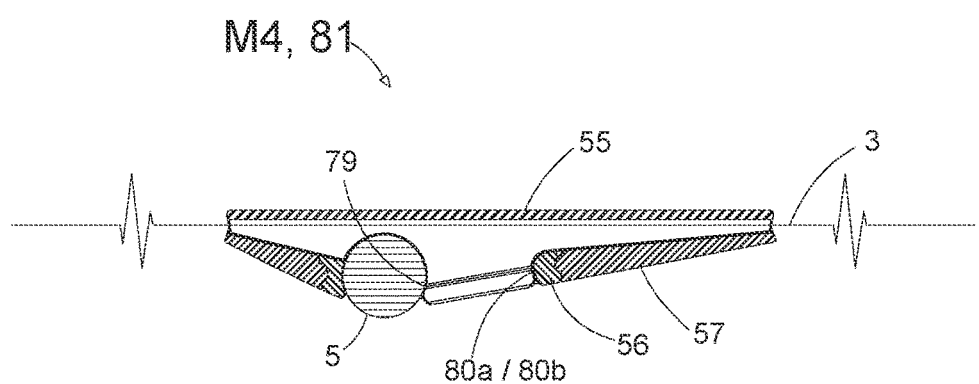

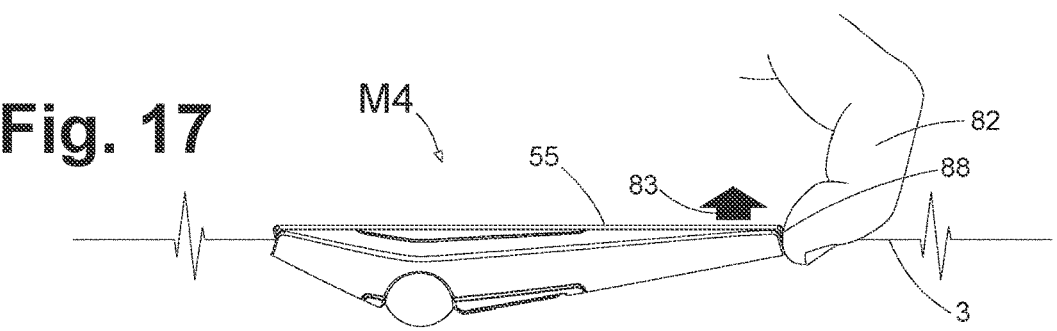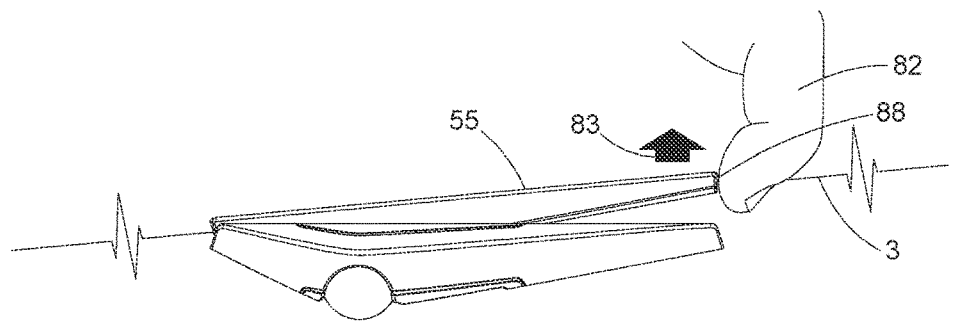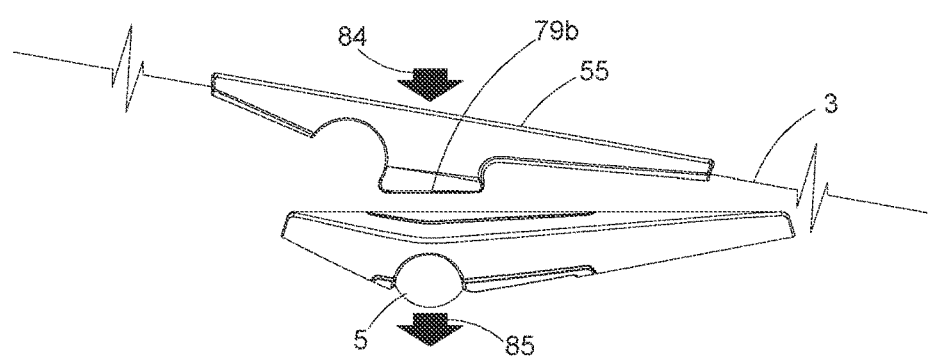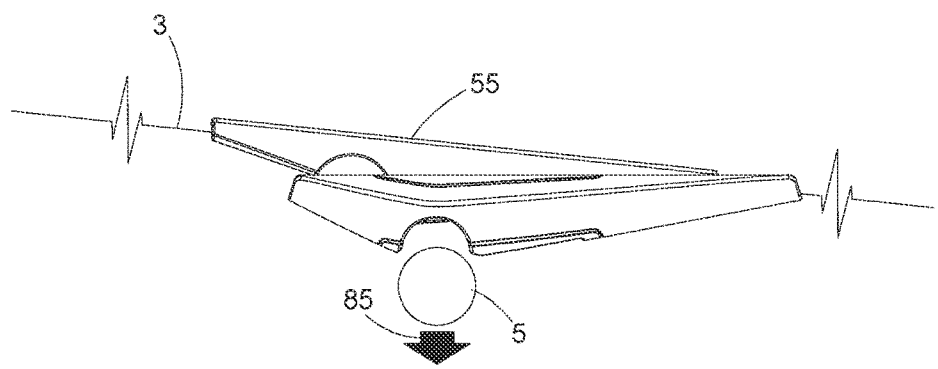

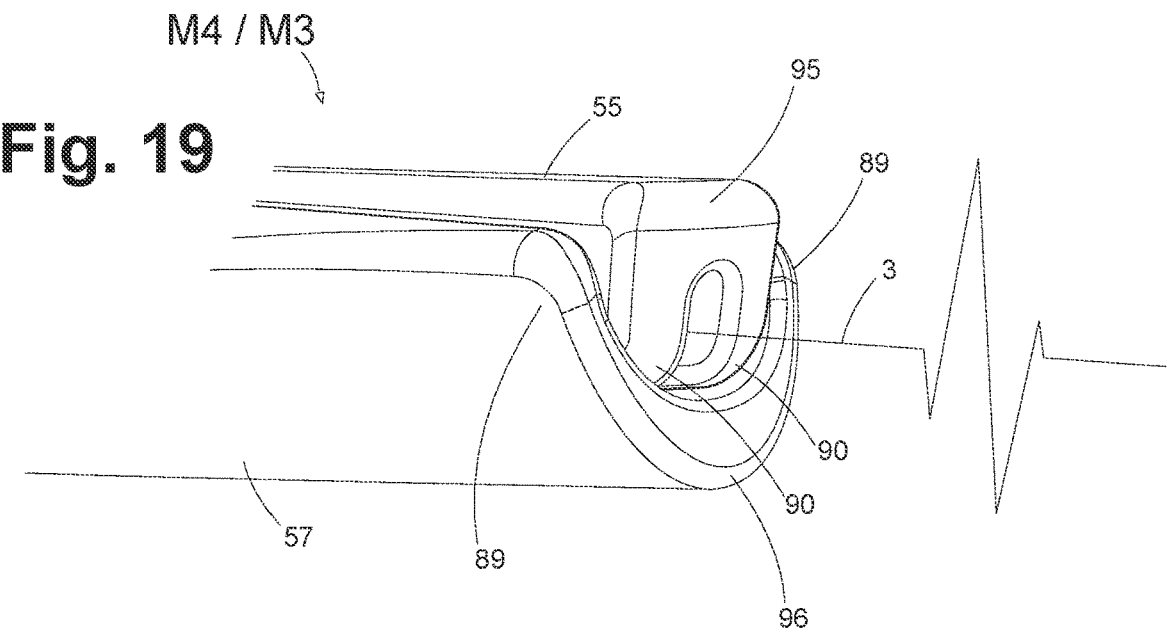
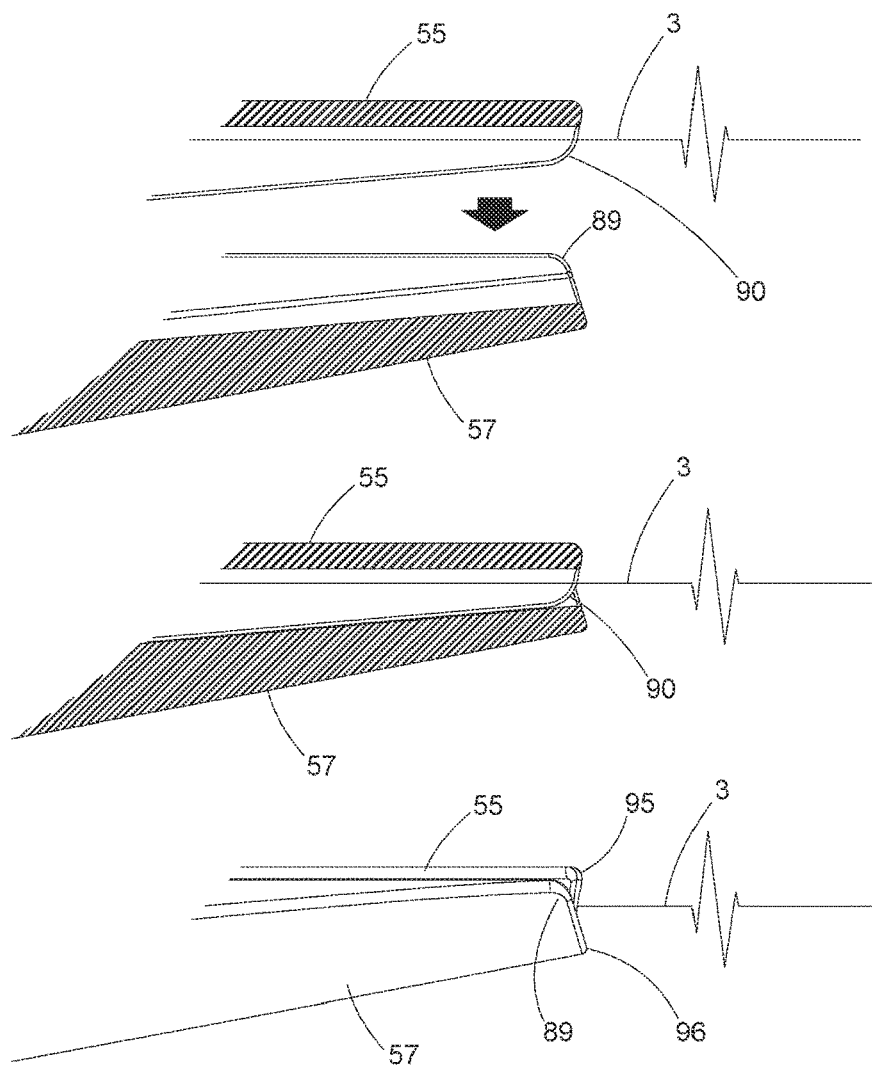
Fig. 19

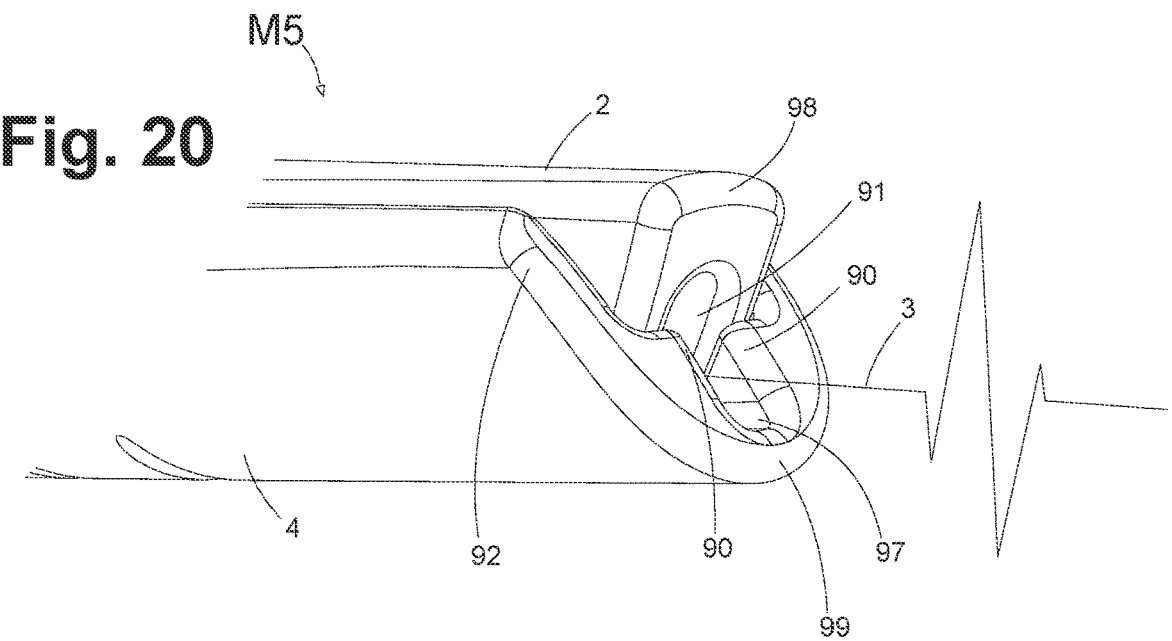
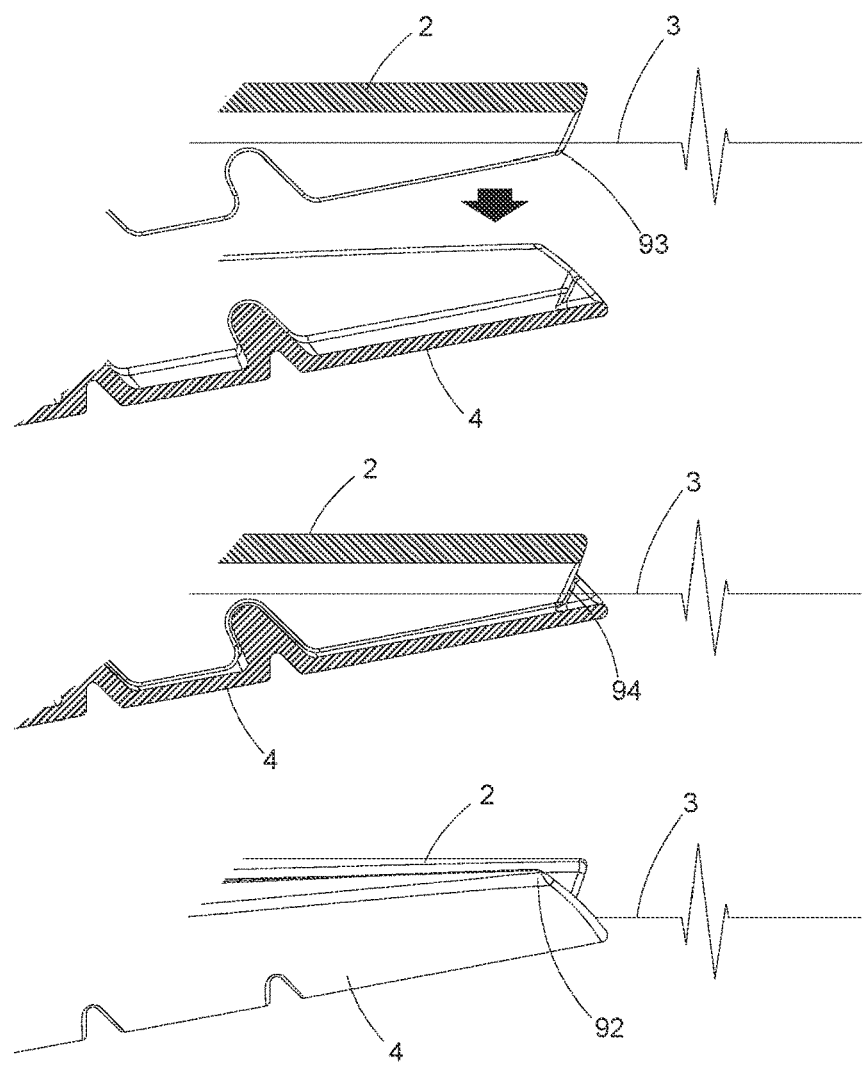
Fig. 20

Fig. 24
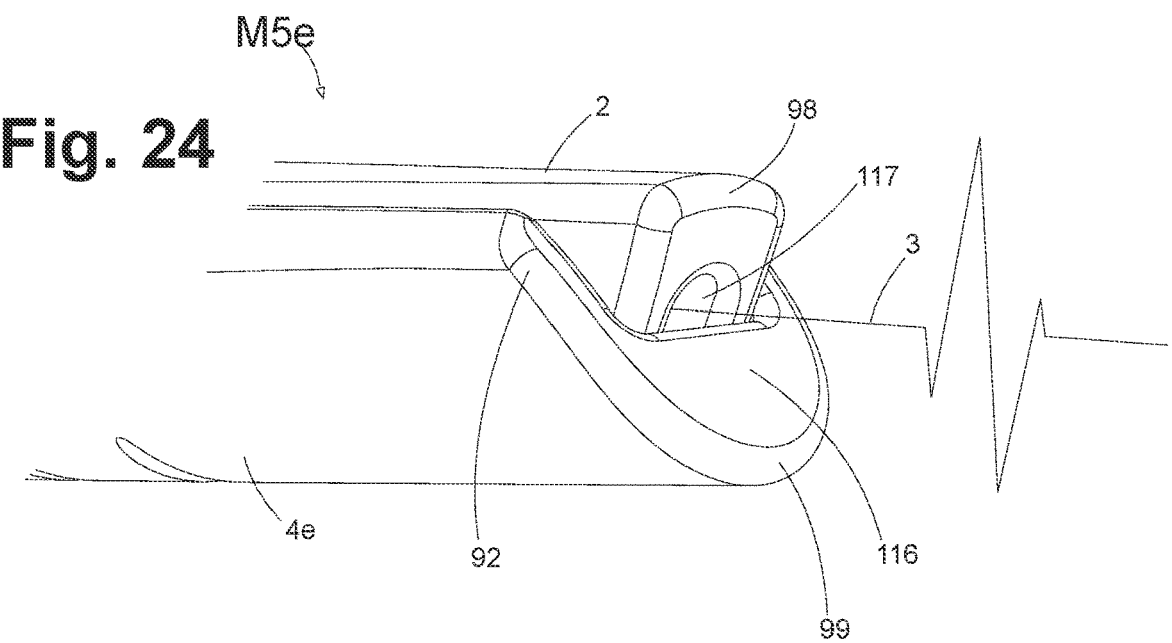
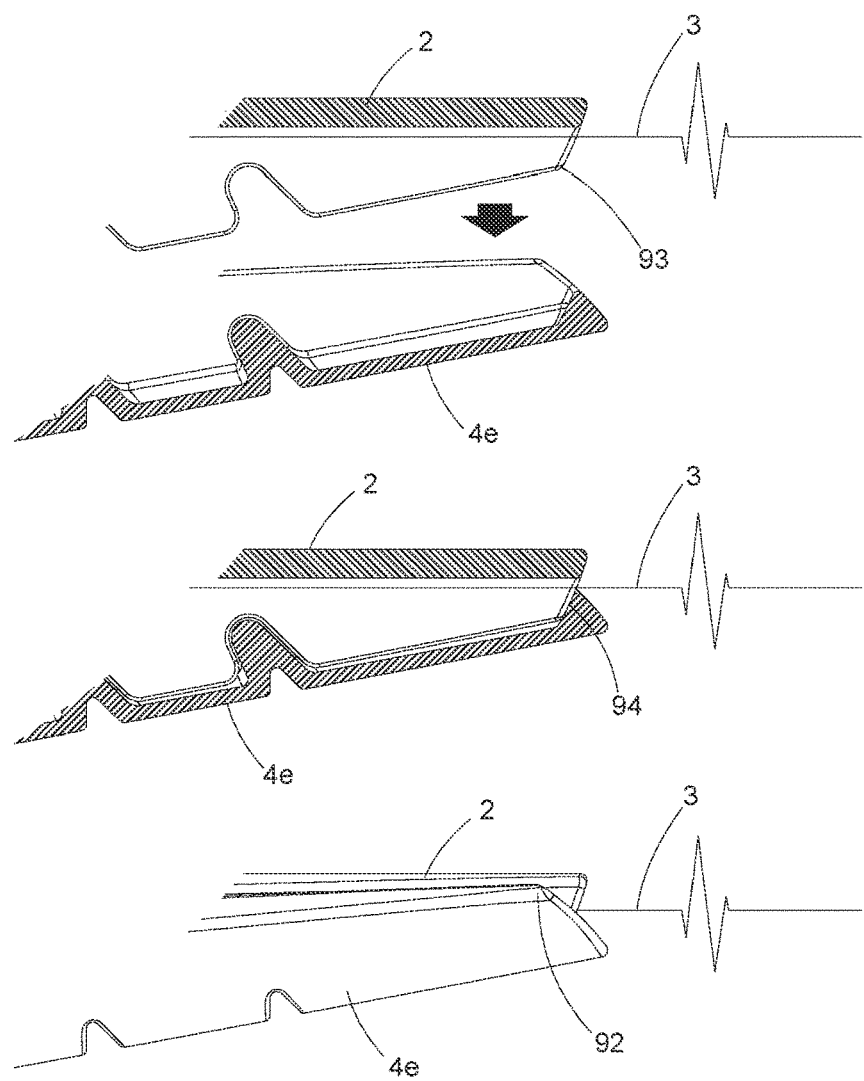

Fig. 25
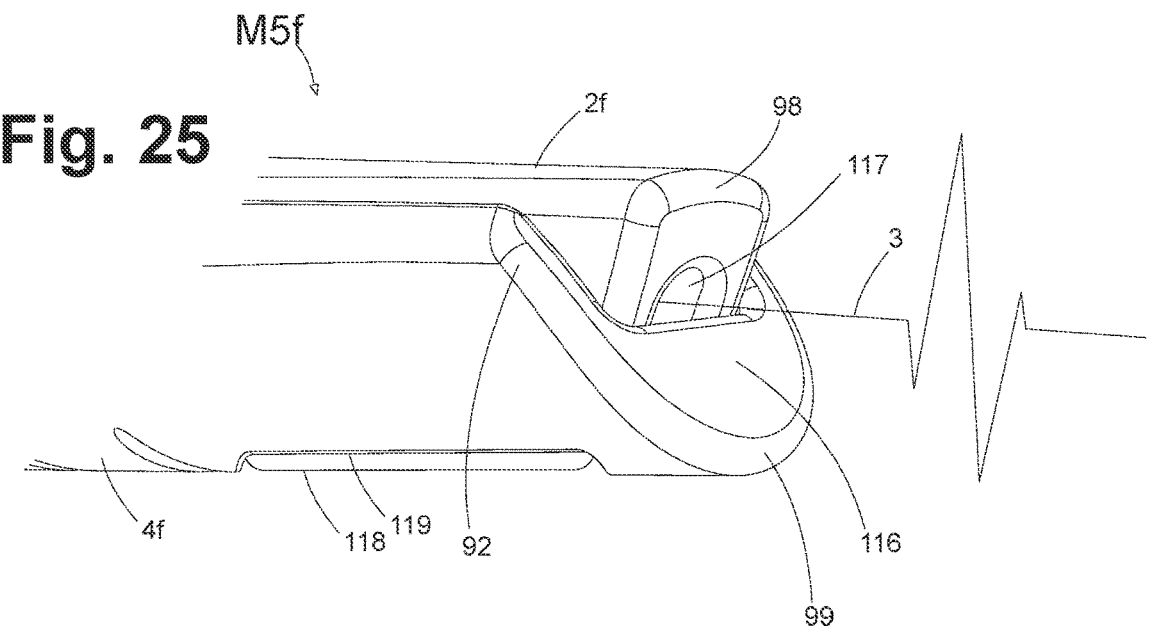
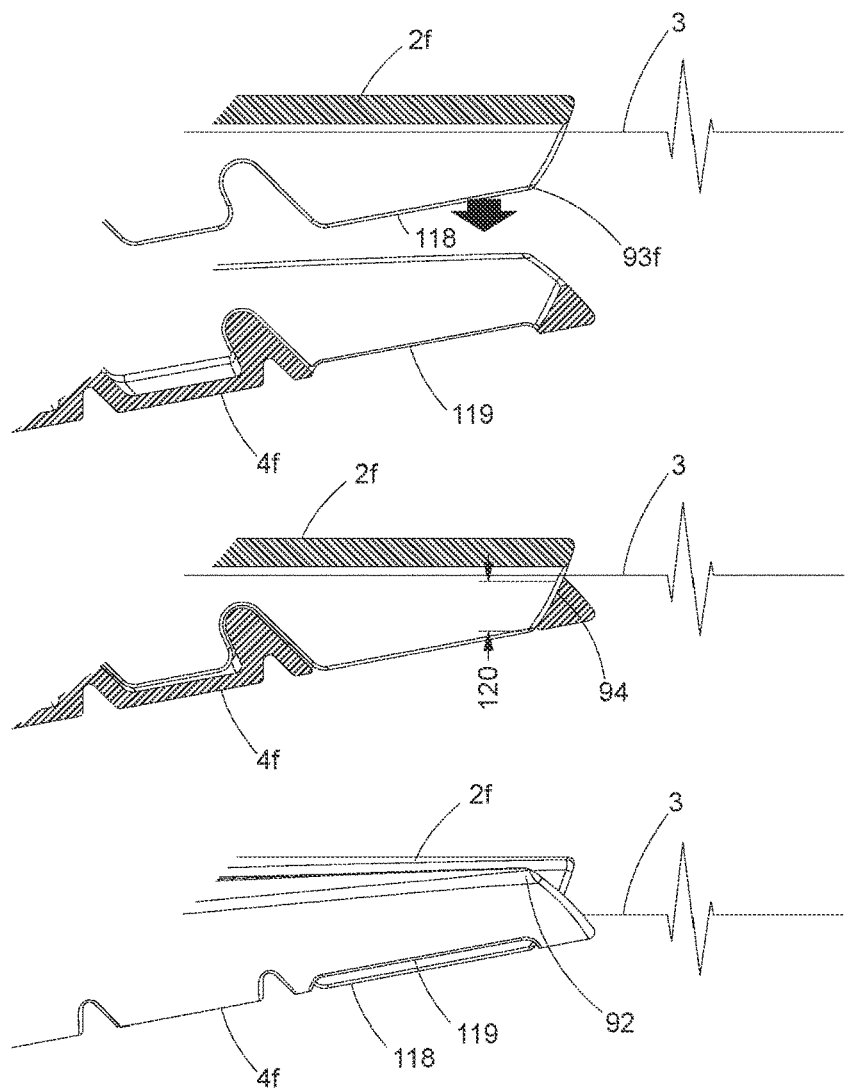

SYSTEM FOR ANGLING

This is a National Phase Application filed under 35 U.S.C. 371 as a national stage of PCT/EP2022/051062, filed Jan. 19, 2022, an application claiming the benefit of Danish Patent Application No. PA 2021 00062, filed Jan. 21, 2021, the content of each of which is hereby incorporated by reference in its entirety.

FIELD OF THE INVENTION

The invention relates to a system for angling, said system comprising, at least a first unit and a second unit, which when assembled forms a part of an angling gear.

Most fishing lures, dive-aids and attractors are made by one or more parts that form a single unit, non-dismantlable and unintended for altering or direct modification without special tools. However, there are lures, dive-aids and attractors that can be altered, are customizable or can be assembled by hand. Of the commercial kind, widely sold and commonly known are weighted lures with changeable soft bodies or body parts, lures with wire opening for changing spoons, pendants or the like, crank baits with adjustable lip for depth control and different variations of line through or runner lures. Several kinds of dive-aids exist, but they require significant prior modification or adjustment to work as lures. Attractors can serve as lures too, but rarely make sense to include as dive-aids. Patent records include several inventions that are manually changeable or customizable directly by hand in terms of appearance, weight, or depth control, or even in motion pattern. However, the unique combined set of characteristics presented by the invention cannot be found anywhere in the commercial range, patent directories or by any other known source.

Fishing with conventional lures, dive-aids and attractors require many units if the fisherman wishes to cover most known or unknown situations that may occur during a fishing trip. Changing lure, dive-aids or attractors can be tedious with knots, clips, loops or threading through tight holes repeatedly. This ultimately results in fewer lure, dive-aid or attractor changes and lost focus on fishing. Often momentum slows down because of lacking confidence in the lure, dive-aid or attractor choice made and fish end up swimming away without striking.

It is the objective of the invention to solve one or more of these problems.

This is achieved by said system comprising, a releasable snap coupling assembly that can lock at least a first and a second unit together.

By the invention, a system is achieved by which no tools are needed to assemble, change, or disassemble the whole or part of a system. The fisherman uses his hands and fingers only to press, pull or hold the units. All units can be assembled, changed, or disassembled repeatedly without any permanent harm or changes to either unit or part of unit.

Embodiments of the invention are recited in the dependent claims 2-9.

To improve readability and fluency, "releasable snap coupling assembly" will be designated "snap-lock unit". The designations in the description of the drawings are as follows:

| | |
|---|---|
| System | (a locked assembly) |
| Locked assembly | (a system) |
| Assembly | (a number of units assembled but not locked) |
| First unit | (a first line unit in a system) |
| Second unit | (a second line unit in a system) |
| Snap-lock unit | (a releasable snap coupling assembly) |
| Back unit | (a complementary snap on unit to a system) |
| Mid unit | (a complementary mid-placed unit to a system) |
| Spoon unit | (a complementary snap on unit to a system) |
| Line | (a fishing line or a leader) |
| Lure | (a fishing lure) |
| Dive-aid | (a system aiding the dive of a rig) |
| Attractor | (a system adding visibility) |
| Rig | (a combination of systems on a line) |

BRIEF DESCRIPTION OF THE DRAWINGS

To better understand the invention, it will in the following be described by way of example, with reference to the accompanying drawings in which:

FIG. 2 shows an embodiment of the invention with different line-setup for different angling situations.

FIG. 8 shows an embodiment of the invention in four pieces, as a system, locked, and exploded.

FIG. 9 shows an embodiment of the invention in three pieces, as a system, locked, and exploded.

FIG. 10 shows an embodiment of the invention in two pieces, as a system, locked, and exploded.

FIG. 11 shows embodiments of the invention in four system versions.

FIG. 13 shows an embodiment of the invention as an option fixed on the line.

FIG. 15 shows an embodiment of the invention, being assembled step by step

FIG. 16 shows an embodiment of the invention being assembled.

FIG. 17 shows an embodiment of the invention, a system being disassembled step by step.

FIG. 19 shows an embodiment of the invention, and how a first and second unit mounts a line in an enclosure.

FIG. 20 shows an embodiment of the invention, and how a first and second unit mounts a line in an enclosure.

FIG. 24 shows an embodiment of the invention, and how a first and second unit mounts a line in an enclosure.

FIG. 25 shows an embodiment of the invention, and how a first and second unit mounts a line in an enclosure.

DETAILED DESCRIPTION

The following description describes in detail embodiments of the invention. Several other variations of the invention described in the following are doable. But for the purpose of explaining the invention, the following are selected. This description should not be construed, however, skilled practitioners in the art will recognize several other aspects of the invention as well. For a definition of the complete scope of the invention, the reader is directed to the claims.

Figure 1:
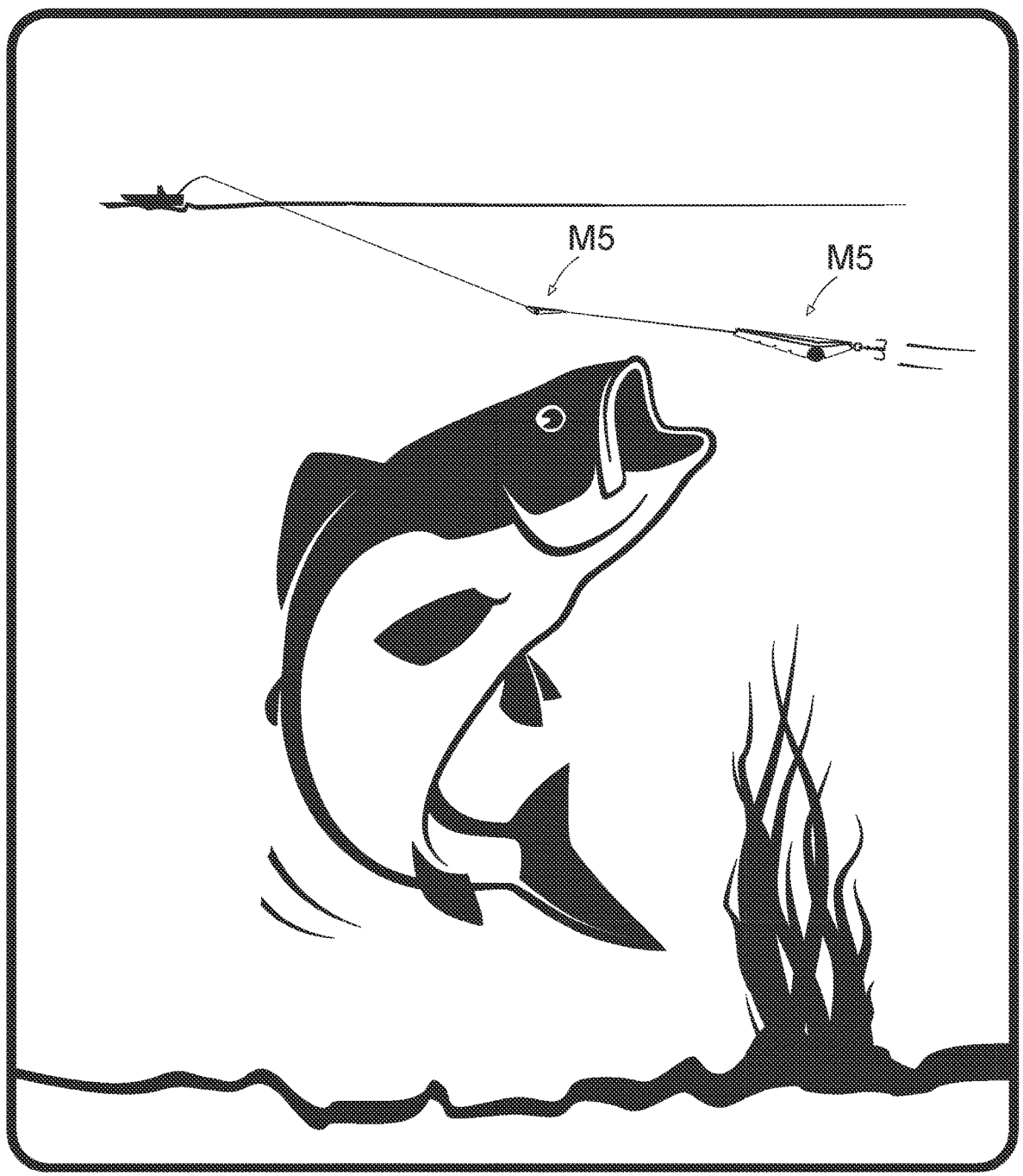
FIG. 1 shows an artistic illustration of an aspect of the invention in use.

Turning to FIG. 1, shown therein an artistic illustration of an embodiment of the invention, in a system M5, in an angling situation viewed under water.

Turning to FIG. 2, shown therein an embodiment of the invention, in a system M5, here appointed M5a and M5b, readily rigged and in an imaginary angling situation. Whereas M5a acts as the lure intended to allure predatory fish into striking on it, to hook the fish at the end of the line and keep the fish hooked until successful landing or netting, M5b acts as a weight and dive-aid intended to force the lure deeper than the lure M5a can do on its own. M5a and M5b can be one system, thus utilizing one as lure and the other as a means of dive-aid. Utilizing M5b in the rig adds the feature of attractor, thereby raising overall visibility to the rig and particularly to the lure at the end of the line M5a. M5a and M5b being one system is one option. However, an optimized embodiment of the invention M5b specialized for diving and, or attraction can be developed within the scope of the invention, also with complementary spoon units 6, or specialized spoons for said specific purpose to further amplify diving. The invention can be utilized from a forward propelled boat 11, or from shore or anywhere fishing can be practiced. The rig M5a/M5b is mainly intended from a boat 11 moving forward, but any setup is possible in any line fishing context where the most obvious is the single M5 rig 12. The M5a/M5b rig needs a swivel 9 or ring 10 tied to the line 3 and leader 13 to hold its distance. However, an alternative method of passing the line 3 through an embodiment of the invention M5 enables a fixed position M5b without the need of swivel 9 or ring 10. All rigs have one or more hook types attached to the end of the line or leader, whereas triple hooks 7, single hooks 8 or microfiber yarn cut 15 are common choices. Variations with one or more hook type rigs 14 in front of the lure can find use in specific situations. These hook type rigs 14 can be fixed on or run along the line. To achieve very different behaviors from the lure M5 it can be fished forward 16 or backward 17 according to retrieve or move direction. This topic is thoroughly described in the overall description of the invention.

Figure 3:
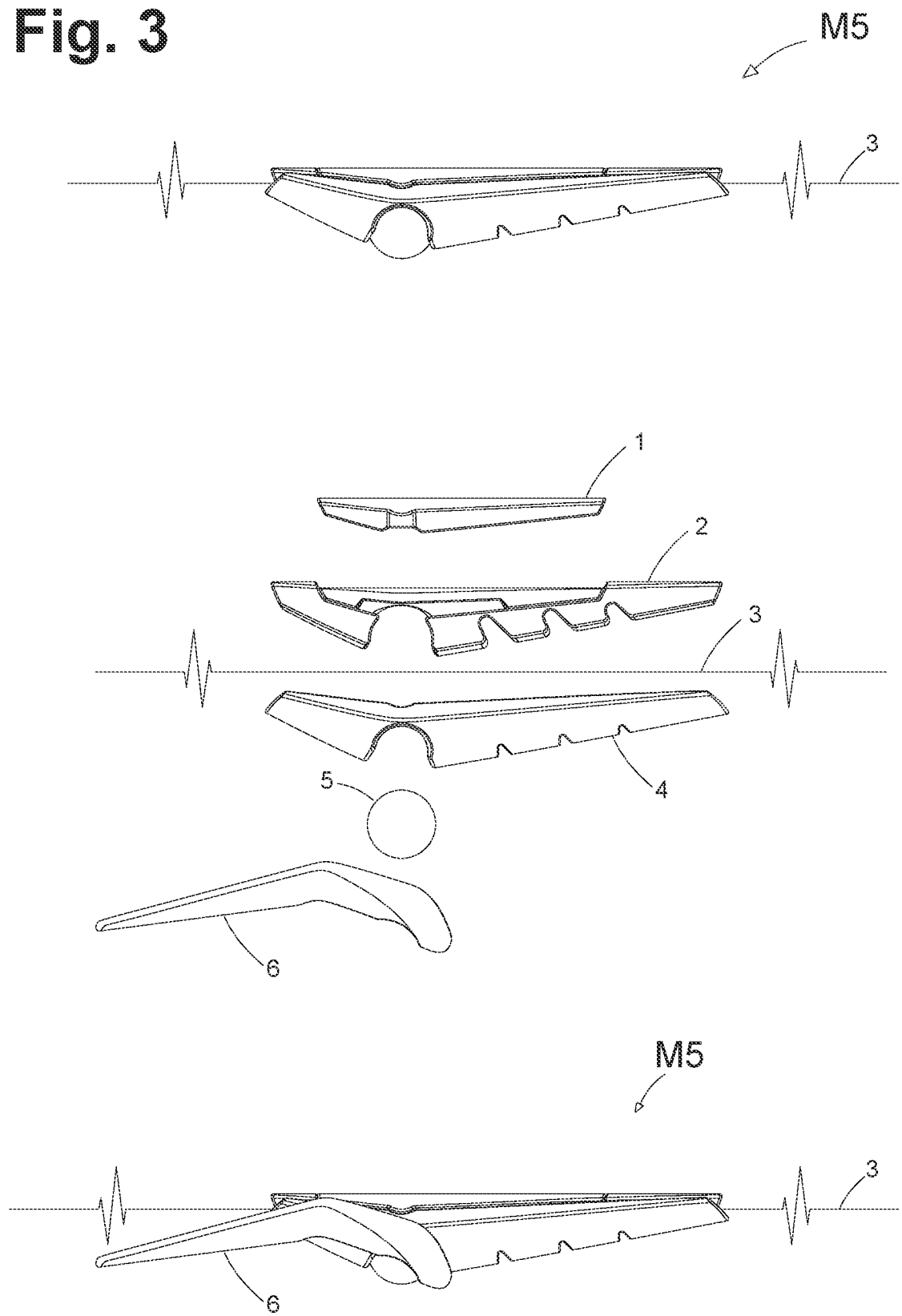
FIG. 3 shows an embodiment of the invention as a system on a line and as the units comprising it.

Turning to FIG. 3, shown therein an embodiment of the invention, in a system M5 assembled and disassembled, showing the back unit 1, the first unit 2, the line 3, the second unit 4 and the snap-lock unit 5. The spoon unit 6 is complementary and can be of various sizes, shapes, and design.

Figure 4:
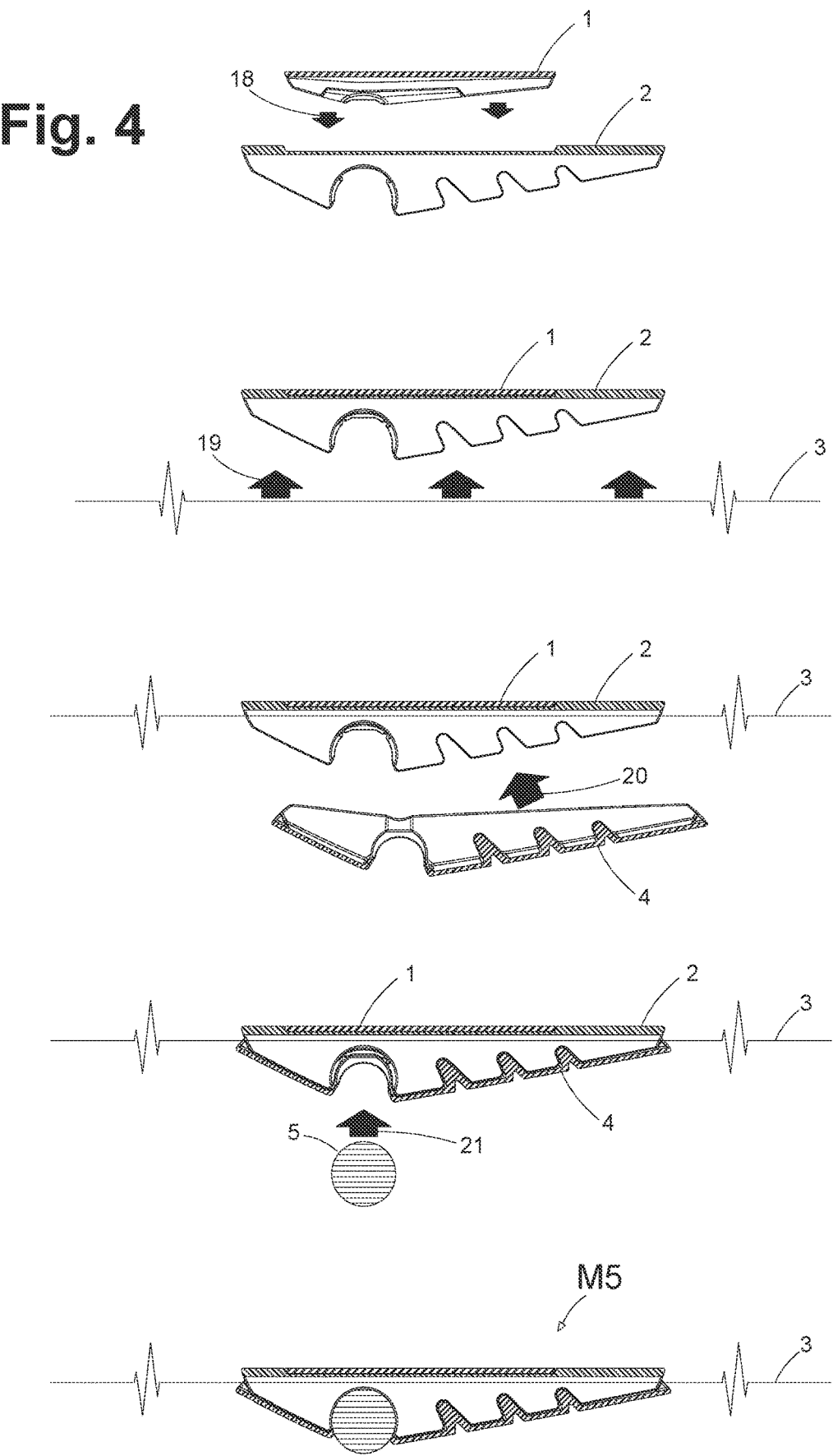
FIG. 4 shows an embodiment of the invention and the assembly step by step.

Turning to FIG. 4, shown therein an embodiment of the invention, in a system M5 as assembly, shown in cross section and explained step by step how the units meet to assemble and lock the system. The back unit 1 snap on to the first unit 2, in the arrow direction 18. The line 3 is then laid into the groove of the first unit 2 in the arrowed direction 19. The lower second unit 4 is moved in the arrowed direction 20 upwards to enclose and fit the upper assembly. To secure and lock the assembly the snap-lock unit 5 is snapped into place in the arrowed direction 21. The system M5 is now assembled and locked with the line inside, free to slide on the line in the line's longitudinal direction.

Figure 5:
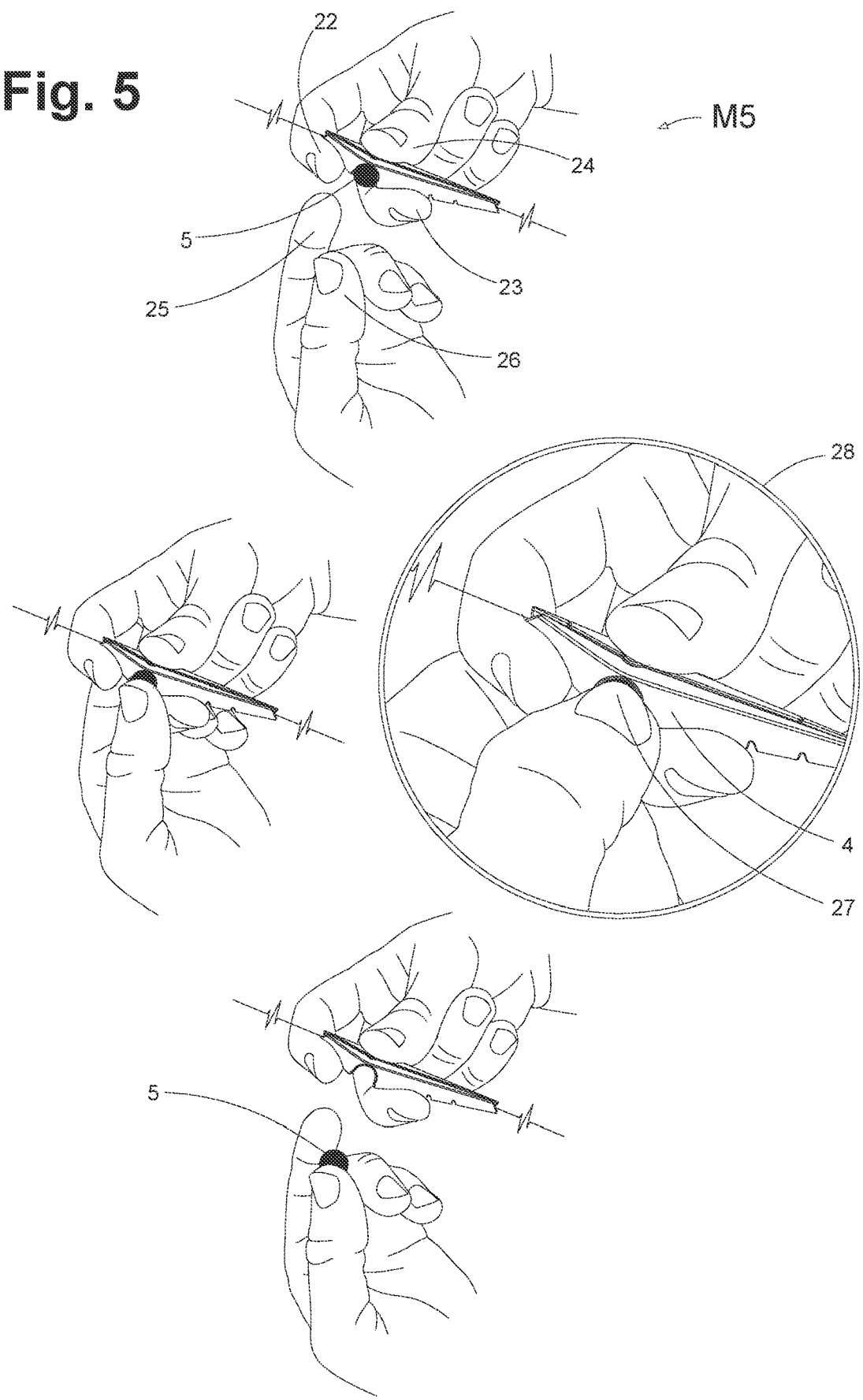
FIG. 5 shows an embodiment of the invention and the unlocking of a system by hand, without tools.

Turning to FIG. 5, shown therein an embodiment of the invention, in a system M5 a method of unlocking the system M5 assembly, by detaching the snap-lock unit 5, without tools and purely by hand. The illustration shows a right-handed operation where the system M5 is held by the right hand in such a way that pressure is applied with the right-hand index finger 22, middle finger 23, and thumb 24 all at the same time. With pressure maintained, the left-hand index finger 25 and thumb 26 move in and grab the snap-lock unit 5. Depending on strength, finger size and preference, one can employ the left thumb fingernail 27 as a wedge between the second unit 4 and the snap-lock unit 5 to better grab the snap-lock unit 5 (as magnified 28). Once the snap-lock unit 5 is released it can be kept in a safe place until further use. The assembly is now unlocked and can be taken apart with ease and without force.

Figure 6:
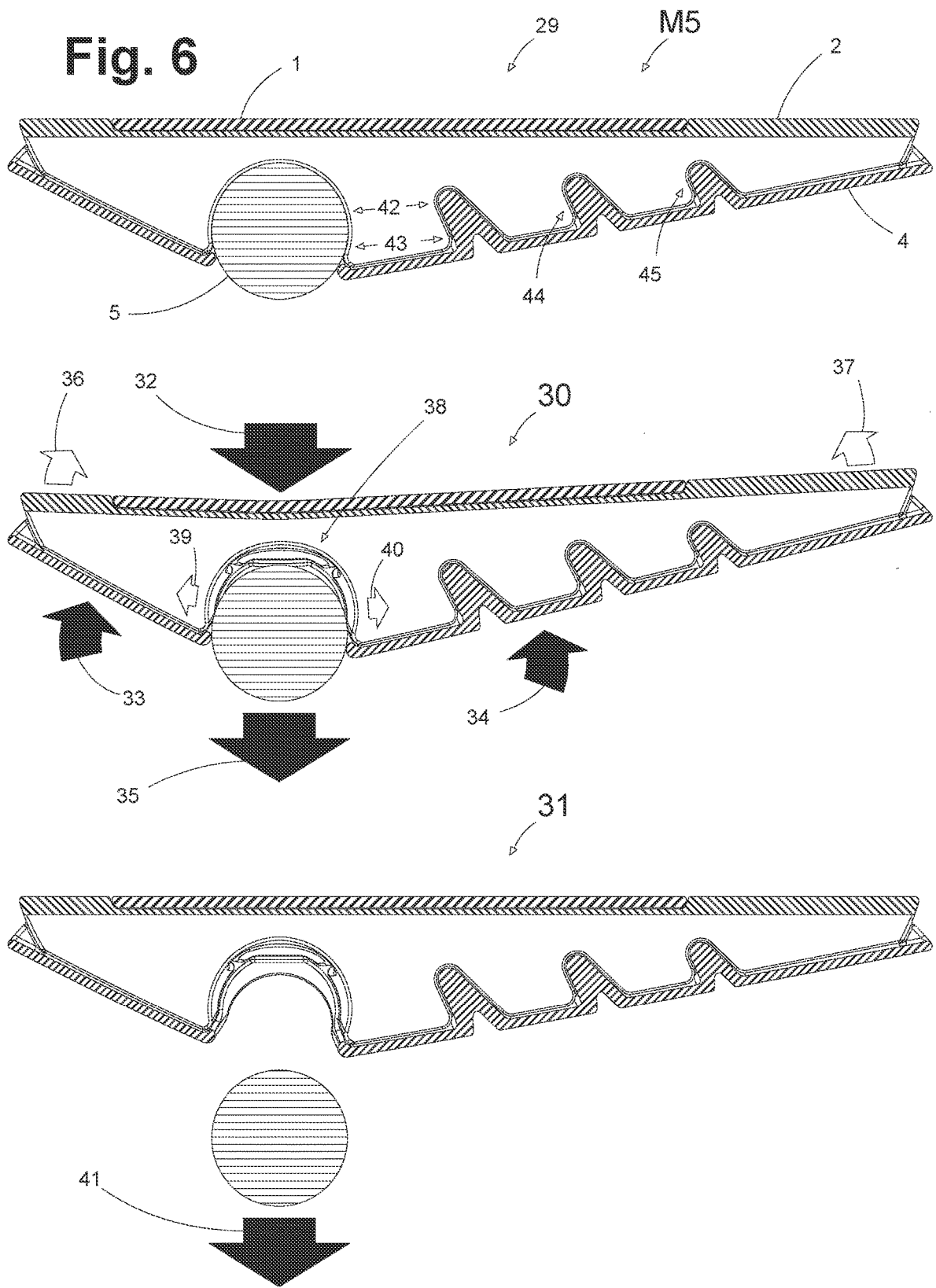
FIG. 6 shows an embodiment of the invention and the works of the mechanics unlocking a system.

Turning to FIG. 6, shown therein an embodiment of the invention in a system M5, a technical description of the mechanical forces and how the snap-lock unit 5 locks and unlocks the system M5. Assembled 29, the snap-lock unit 5 acts as the overall locking unit for all the units in the system M5. The units lock together because of the narrow upper shape 42 and the wider lower shape 43 between the first unit 2 and the snap-lock unit 5. Further interlocking is obtained by two additional positive ridges 44, 45 in the second unit 4, matching the negative cut-outs in the first unit 2. To dismantle 30 or change any of the units, the snap-lock unit 5 must first be removed. A suitable amount of pressure is applied to three places simultaneously 32, 33, 34. The applied pressure is supported by a suitable amount of pull-force 35 to the snap-lock unit 5 and the system is unlocked 31. When pressure is applied to the three points 32, 33, 34 the whole system, except the snap-lock unit 5 flexes, the ends move upwards 36, 37 and the gap 38 holding the snap-lock unit 5, opens up 39, 40 so that the snap-lock unit 5 can be released 35, 41. With the snap-lock unit 5 released the second unit 4 and the first unit 2 with back unit 1 can be separated.

Figure 7:
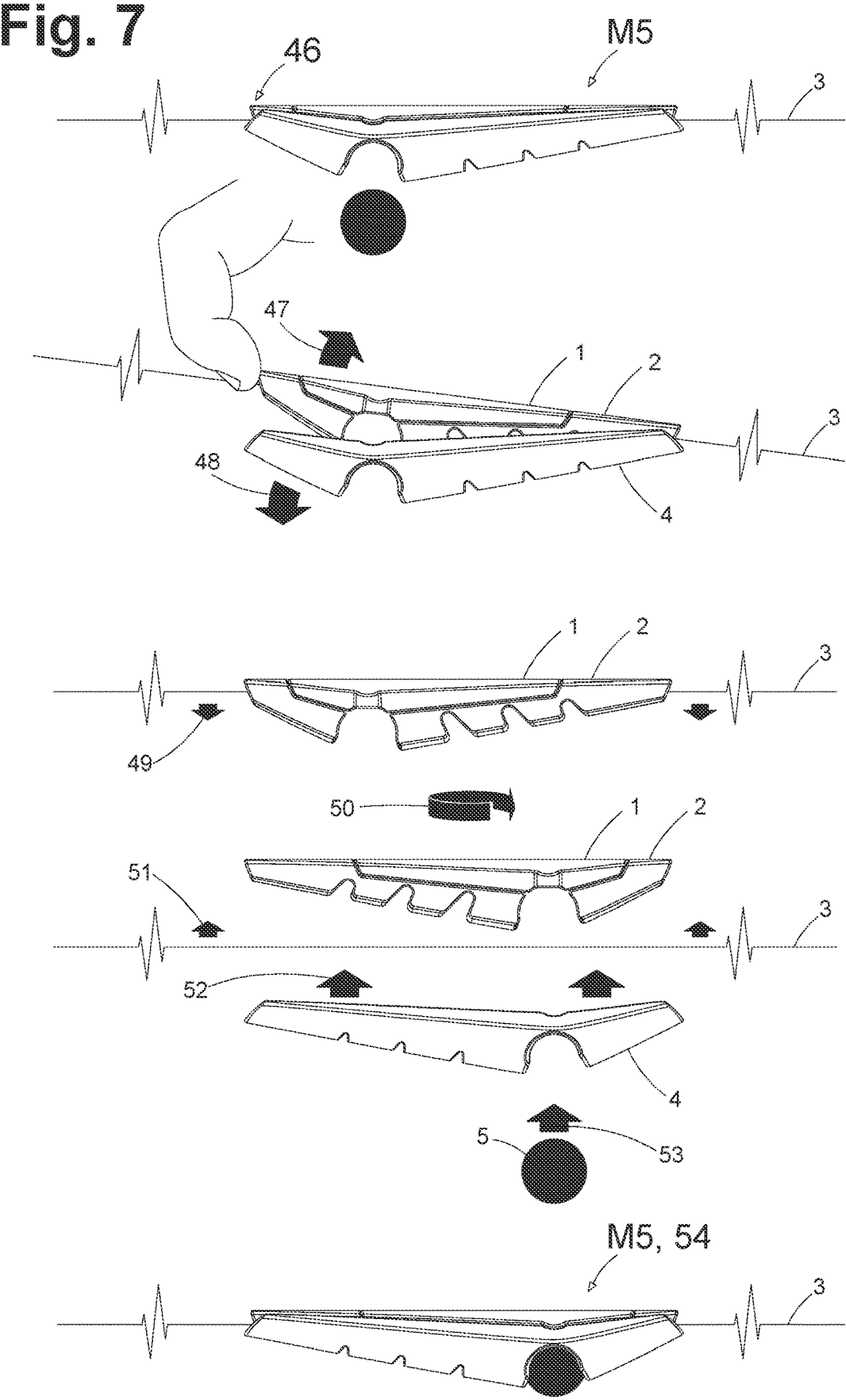
FIG. 7 shows an embodiment of the invention and the disassembly, change of direction and reassembly.

Turning to FIG. 7, shown therein an embodiment of the invention, in a system M5, as assembly with the snap-lock unit 5 detached and an explanation of how to change direction of the system M5 on the line 3. The assembly is held in the palm of one hand, then the end 46 of the first unit 2 is picked up with the tip of the index finger on the opposite hand and pulled apart 47, 48. The line 3 is then lowered 49 from the first unit 2 and the first unit 2 is turned in the opposite direction 50. The line 3 is then placed 51 back in the first unit 2 and the second unit 4 is assembled 52 with the first unit 2. To lock the assembly the snap-lock unit 5 is snapped 53 in place and the system M5 is locked 54 around the line 3 and can slide on the line 3 in the longitudinal direction.

Turning to FIG. 8, shown therein an embodiment of the invention in a system M4, shown assembled and disassembled with a first unit 55, the line 3, a mid-unit 56, a second unit 57 and the snap-lock unit 5.

Turning to FIG. 9, shown therein an embodiment of the invention in a system M3, shown assembled and disassembled showing a first unit 55, the line 3, a second unit 58 and the snap-lock unit 5.

Turning to FIG. 10, shown therein an embodiment of the invention in a system M2, with an enclosure in which a line can be mounted in such a way that a second unit 59 can slide on the line in the longitudinal direction of the line. The system M2 is shown assembled and disassembled with the line 3, a second unit 59 and the snap-lock unit 5.

Turning to FIG. 11, shown therein embodiments of the invention as four different systems for the purpose of comparison. An illustrative lineup of systems M5, M4, M3 and M2 pictured from the back, side and above.

Figure 12:
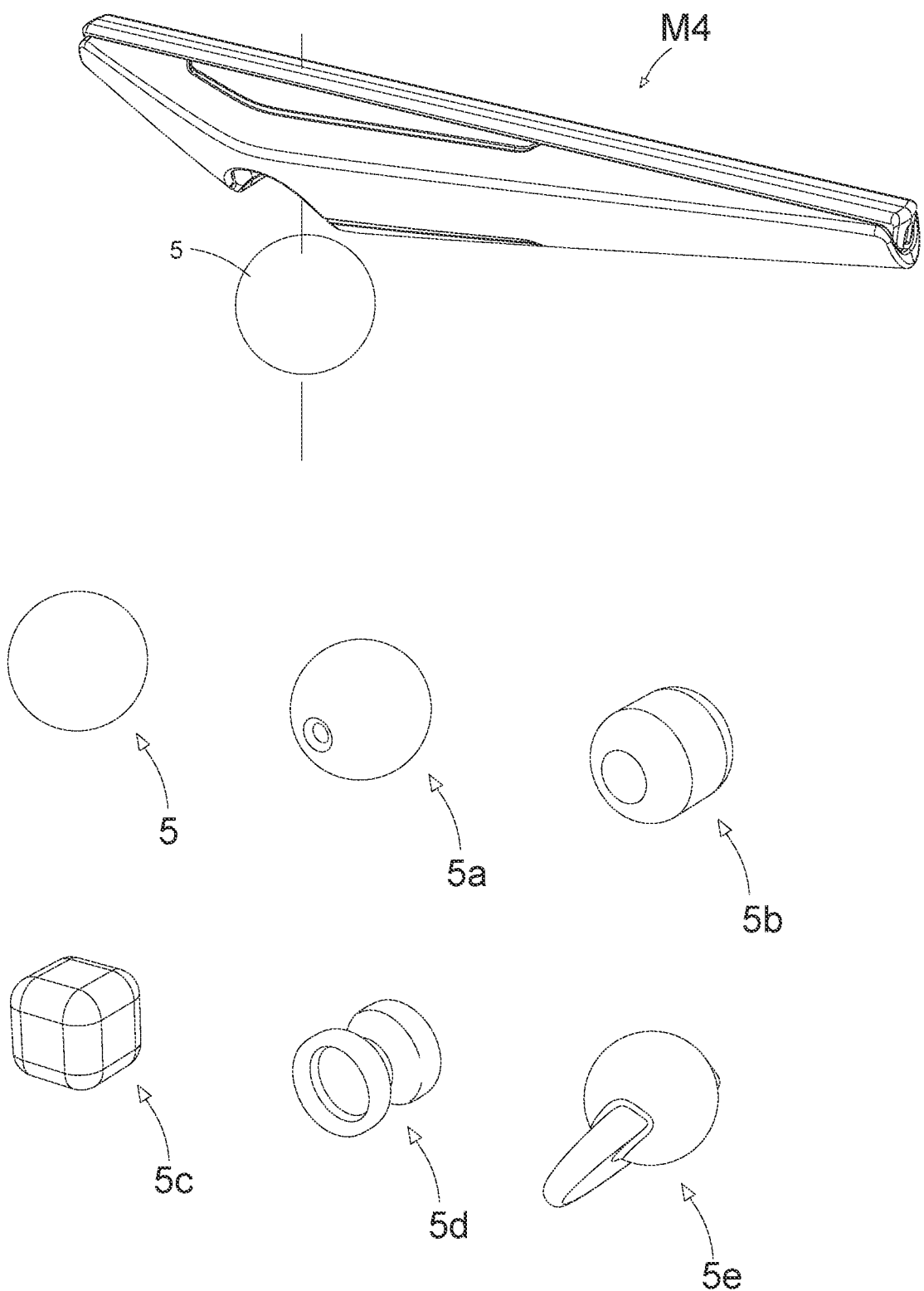
FIG. 12 shows an embodiment of the invention and different versions of a snap-lock unit.

Turning to FIG. 12, shown therein an embodiment of the invention, in a system M4 (might as well be M5, M3 or M2) with the snap-lock unit 5 detached. The basic function of the snap-lock unit 5 in a two-unit system M2 is to add weight. The basic function of the snap-lock unit 5 in systems comprising more than two units is to lock the assembly. But in all four listed systems the snap-lock unit 5 can function as both weight and locking unit. Despite the different functions the snap-lock unit 5 can have different shapes from spherical 5, 5a to rounded 5b, 5c, going to more complex shapes like a time glass 5d, to a ball with a shaft or collar 5e. The listed shapes 5, 5a, 5b, 5c, 5d and 5e are examples, many other shapes can fill the purpose too. But for any shape chosen applies the overall description of the invention.

Turning to FIG. 13, shown therein an embodiment of the invention in a system M5, with a fixed line setup 66. A fixed first unit 2f is made with two grooves on either side (60a-60d). The grooves are curved inwards, they are deep enough and shaped to best fit the line 3. To fit a system M5 with the fixed first unit 2f on the line 3, the line 3 is placed 61 in the deep center groove 60g of the fixed first unit 2f. The line 3 is then pushed inwards in the longitudinal direction 62 so that a line twist 3s can be formed and placed in one side-groove 60a and then a second line twist 3t can be placed across in the next opposite side line-groove 60d. The line is then fed back into the center groove 60g. The line now starts and ends in the center groove 60g, but the line twists from one side-groove across to the other opposite side-groove (as 60a to 60d or 60c to 60b). When the fixed first unit 2f, now holding the line, is assembled 64 with the second unit 4 and locked 65 with the snap-lock unit 5, the system M5 is fixed 67 on the line when tension 63 is applied in either end of the line 3. Some types of lines may need more twisting between the sideline-grooves from side to side in the fixed first unit 2f to fix a position of the system.

Figure 14:
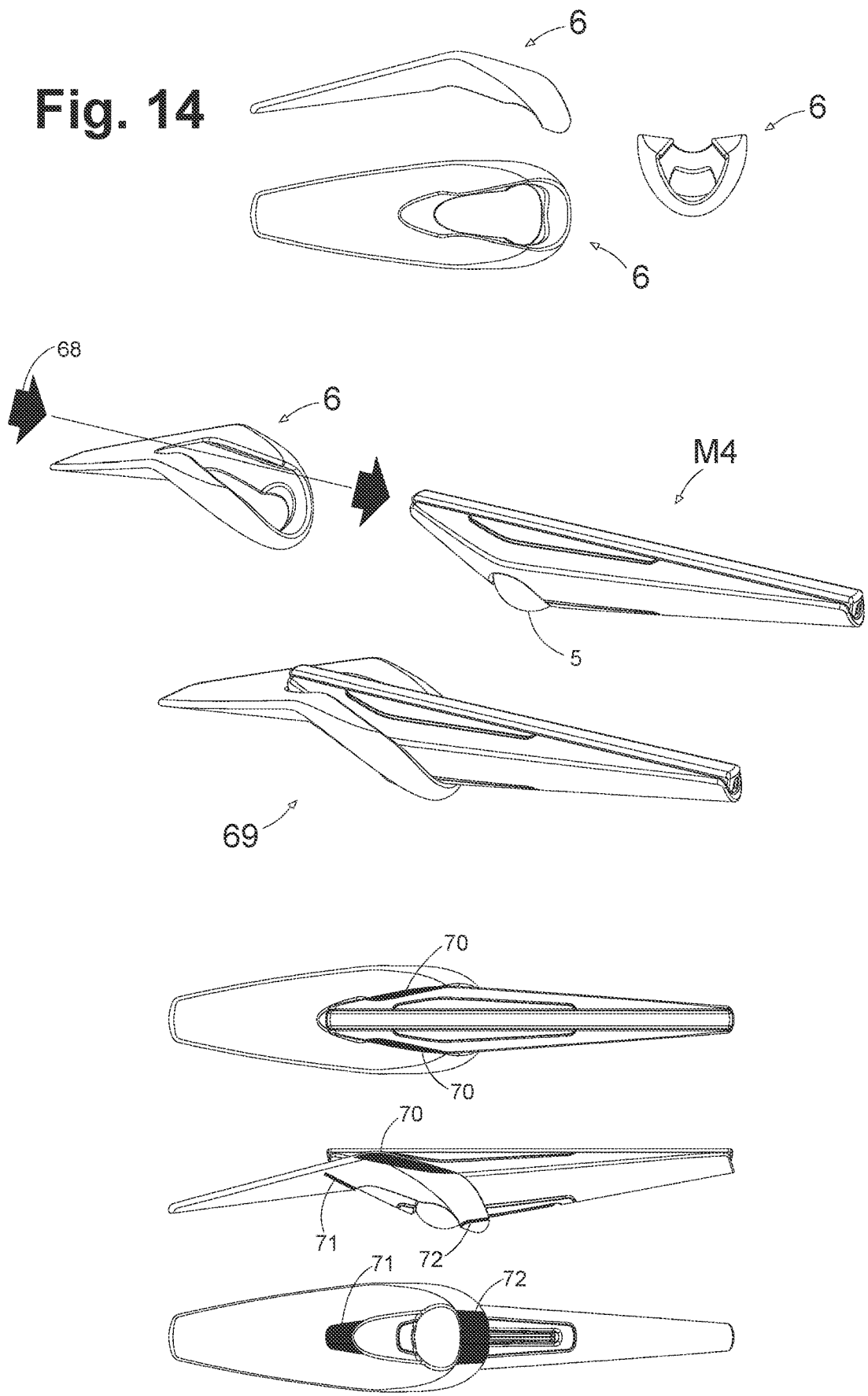
FIG. 14 shows an embodiment of the invention and the fit of a complementary spoon unit on a system.

Turning to FIG. 14, shown therein an embodiment of the invention in a complementary spoon unit 6 alone and with a system M4. The spoon unit 6 is mounted by pressing it against the end of a system M4 (or M5, M3, M2, or M6) in a longitudinal direction 68 until it snap-locks 69 over the snap-lock unit 5. The spoon unit 6 is locked by the snap-lock unit 5, but the strong hold is possible because of the upper holding points 70 holding against the lower forward holding point 71 and the rear holding point 72. This gives a very sturdy hold, that can easily be unmounted with just one hand when required.

Turning to FIG. 15, shown therein an embodiment of the invention in an assembly of a system M4, step by step, illustrated as a cross section for better visibility and understanding. First the mid unit 56 is lowered 74 into the second unit 57 and snapped in place by pairing the holding points 73a-c and 73b-d. Then the Line 3 is placed 75 in the first unit 55 and the snap-lock unit 5 placed in its cavity 76.

Turning to FIG. 16, shown therein the continued assemble of a system M4 step by step. The first unit 55 is lowered into the second unit 57 and force is applied to the raised end 78. When applying force 78 to the raised end, the lower part of the first unit 55 will be forced down between the snap-lock unit 5 and the inner side 80b of the mid unit 56. The lower long end 79 of the first unit 55 will glide down against the snap-lock unit 5, whilst the short end 80a will push against the inner side 80b of the mid unit 56 until it holds and locks the whole assembly 81.

Turning to FIG. 17, shown therein an embodiment of the invention in a disassembling of a system M4, step by step. The far end 88 of the first unit 55 is first pinched with one finger 82, then pulled 83 apart from the system to unlock the assembly. With the first unit 55 loose and with or without the Line 3 following, the first unit 55 is pushed down 84, with the mid-placed protruding piece 79b, towards the snap-lock unit 5 to loosen it 85.

Figure 18:
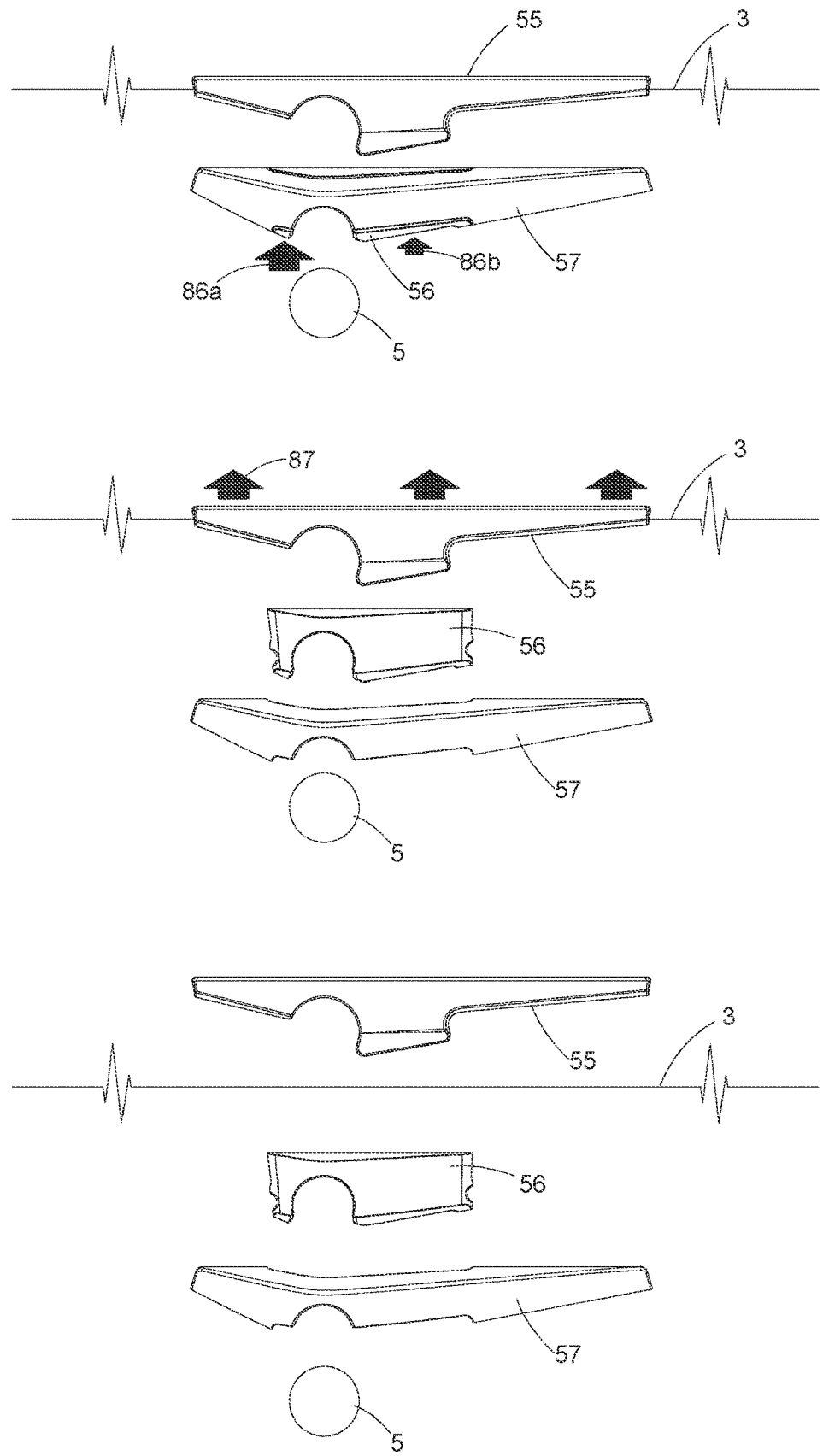
FIG. 18 shows an embodiment of the invention, a system being fully disassembled into units.

Turning to FIG. 18, shown therein the continued disassembling of a system M4 step by step. The mid unit 56 is released by first pushing 86a at the smallest protruding point touching the snap-lock unit 5. Then the larger protruding point is pushed 86b to take out the mid unit 56 from the second unit 57. To complete the disassembling, the first unit 55 is lifted 87 of the line 3. Completely disassembled, shown from top to bottom, is the first unit 55, the line 3, the mid unit 56, the second unit 57 and the snap-lock unit 5.

Turning to FIG. 19, shown therein an embodiment of the invention in a system M3/M4, that secures the system to stay on the line 3, preventing the line 3 from getting caught and "creep" out between the first unit 55 and the second unit 57. The line stays in place because the fit between the first unit 55 and the second unit 57 is tight and precise and because the rounded shape 90 of the lower ends of the first unit 55 does not easily grab the line. Furthermore, the rounded shape 90 of the lower ends of the first unit 55 is covered by the upper ends 89 of the second unit 57 and the end edge of the second unit 57 slightly more protruding 96 than the end edge of the first unit 55, which is slightly drawn back 95. All in all, making it hard for the line to catch and wedge itself between the parts. Both ends in the longitudinal direction of a system M3/M4 can overall be designed in the same way.

Turning to FIG. 20, shown therein an embodiment of the invention in a system M5, that secures the system to stay on the line 3, preventing the line 3 from getting caught and "creeping" out between the first unit 2 and the second unit 4. The line stays in place because the fit 94 between the first unit 2 and the second unit 4 is tight and precise and because the indented side-edges 90, at the ends of the second unit 4, closely border the ends, inner sides 91, of the first unit 2, to be parallel in a straight line, pointing through the inner groove of the first unit 2, with the inner groove sides of the first unit 2. This combined with the lower ends 93 of the first unit 2 being covered by the higher ends 92 of the second unit 4 and the protruding end edge 99 of the second unit 4 over the end edge 98 of the first unit 2. Furthermore, the low profile of the matching groove 97, in the end of the second unit 4, allows for a more vivid retrieval motion when used as lure. Both ends in the longitudinal direction of the system M5 can overall be designed in the same way.

Figure 21:
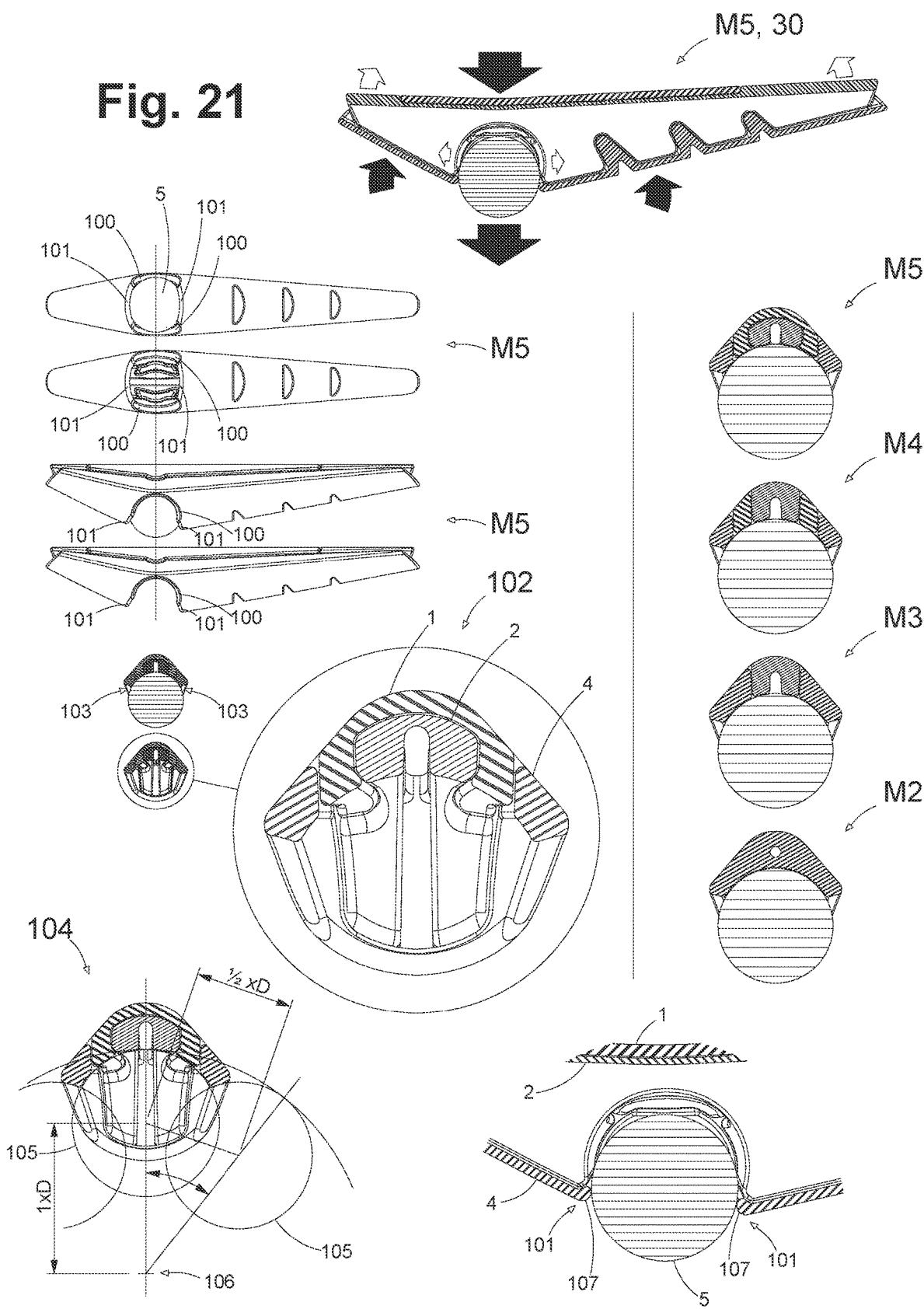
FIG. 21 shows an embodiment of the invention in detail on how the units lock together, and how units relate to overall flexing.

Turning to FIG. 21, shown therein, an embodiment of the invention in a system M5 and the relationship between the snap-lock unit 5, the cavity side framing 100, the perimeter edges 101 and the ability of the system to flex and bend just the right amount in the longitudinal direction for the snap-lock unit 5 to rest safely, while locking the system, but being loose enough for dismantle 30 by hand, with suitable force applied. The system M5 can flex the most compared to the other systems M4, M3 and M2 in the drawings, because of the three-part layered assembly comprising the back unit 1, the first unit 2, and the second unit 4. The material thickness of all three units is relatively thin, this together with an overlapping snap and interlocking, makes a system able to flex just right, even with stiff and rigid materials like most plastics and some metals. A cross section of the system M5 assembly, shown with and without the snap-lock unit 5, illustrates the special layered design. A magnification of the cross section 102 shows the units and how they cover each other like layers. For comparison, the other systems M4, M3 and M2 in the drawings are also shown in cross section. The system M4 can flex less than the system M5. The system M3 can flex even less and the system M2, with the thickest unit body and the least number of parts, can flex the least. Generally, for the snap-lock unit 5 to be loosened by hand in any system goes that; the stiffer a system is the wider the cavity framing 100 must be, and the more exposed the snap-lock unit 5 must be. This can be challenging to get just right because of the very little tolerance between the snap-lock unit 5 locking too tight or locking too loose. If too tight tools are needed, if too loose the snap-lock unit 5 may accidently come loose on impact with entering water or during casting.

The ability of a system to flex just right, while holding a snap-lock unit 5 in place securely, and still accommodate locking and unlocking by hand alone, is possible because of the material, the wall-thickness and the relationship between the units. But another very importing factor is the ability to grab a snap-lock unit 5 in a system and get a firm enough grip on it, when locked in its cavity to pull and unlock it. To do so with the fingers, the cavity framing groove 103, can be made in such a way that the tip of a thumb, on one side of a system, is able to wedge down between the snap-lock unit 5 and the second unit 4 while pressing on the opposite side with the index finger, of the same hand, and get a firm grip on the snap-lock unit 5. The shape and size of the cavity framing groove 103 on both sides of a second unit 4 closely resembles the inverted snap-lock unit 5 shape, as cut-out on both sides of the second unit 4 next to the snap-lock unit 5.

This relationship between the center and the side cut-outs, that ensures sufficient space to remove the snap-lock unit 5 by hand, can approximately be formulated like this 104: The snap-lock unit 5 shape 105 is rotated to the side with center of rotation 106 at about the length of one diameter 1×D from the snap-lock unit 5 shape's 105 center, pointing downwards. The length of rotation for the cut-out shape is about half the length ½×D of one diameter of the snap-lock unit 5 shape.

The perimeter edges 101 of the second unit 4 on each side of the snap-lock unit 5 in the line's longitudinal direction act as the final holding edges for the snap-lock unit 5. The perimeter edges 101 are rounded to the minimum rounding 107 allowing the Snap-lock Head 5 to enter and exit its cavity without damaging or changing the edges of the second unit 4 material.

Figure 22:
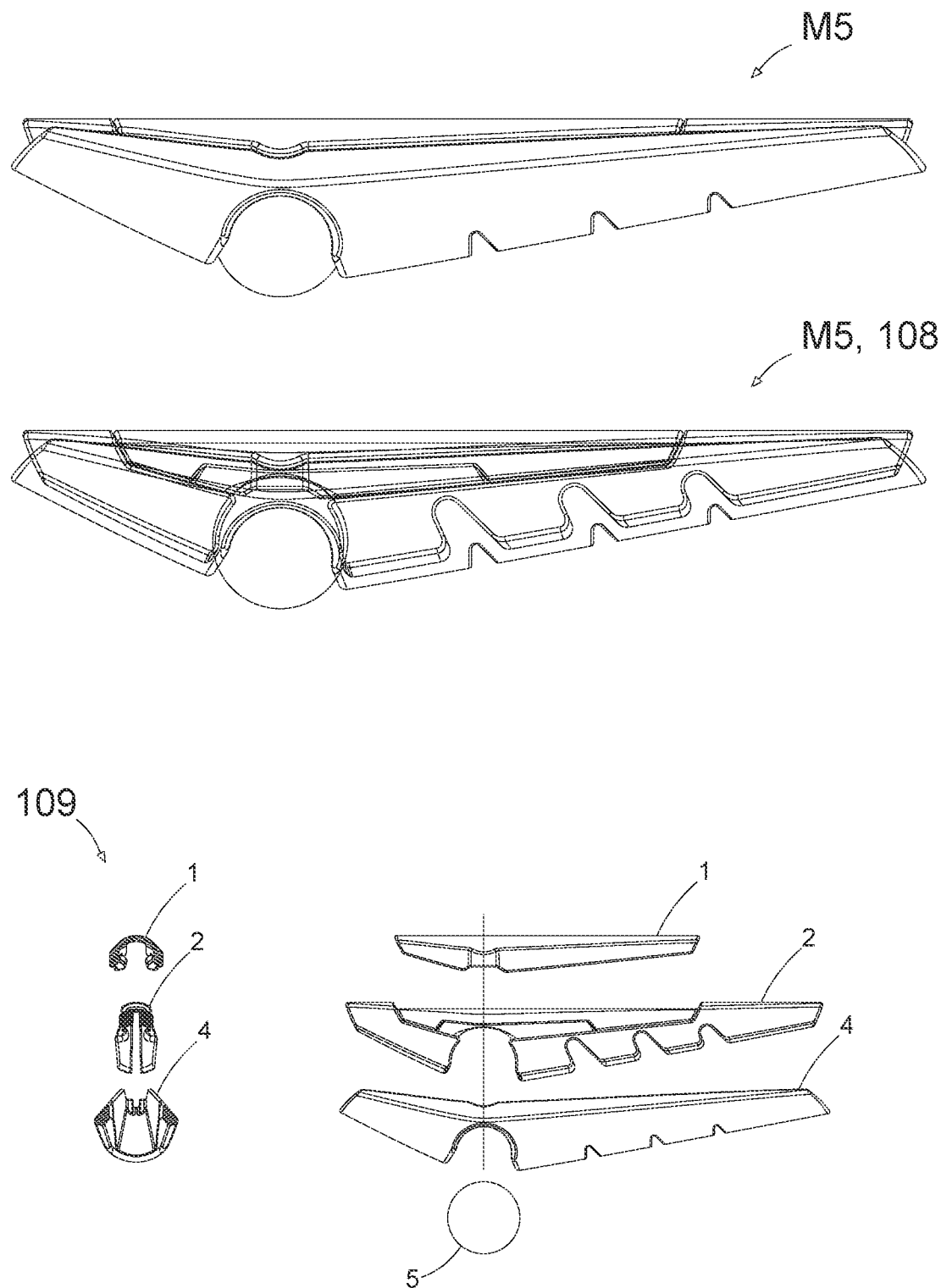
FIG. 22 shows an embodiment of the invention, overlapping properties related to color mixing between units and parts of units.

Turning to FIG. 22, shown therein, an embodiment of the invention in a system M5 and the three-part layered, overlapping assembly 108 consisting of the back unit 1, the first unit 2, and the second unit 4 with attention on the parts in a transparent, semi-transparent material, in combination with a non-transparent material. The wall thickness 109 of all three parts is relatively thin, this together with the overlapping 108 of the parts with transparency, influenced by daylight and the modular interchangeable design, enables individual colors for each unit and the color mixing between the units, beyond the individual unit colors themselves. One example could be the first unit 2 in yellow, the back unit 1 in transparent to semi-transparent purple, the second unit 4 in transparent to semi-transparent blue. For simplicity in this example the Snap-lock Head 5 will just be plain chrome, but it can be any color or have any surface properties. Beside yellow, purple, and blue the colors purple on yellow would give red colors. Blue on yellow would give green colors and blue on purple and yellow would give dark blue to dark turquoise color. And depending on the direction of light and viewing angle, a wide array of colors would be visible. This specific composition exposed to daylight would closely resemble the visible colors of a rainbow.

Figure 23:
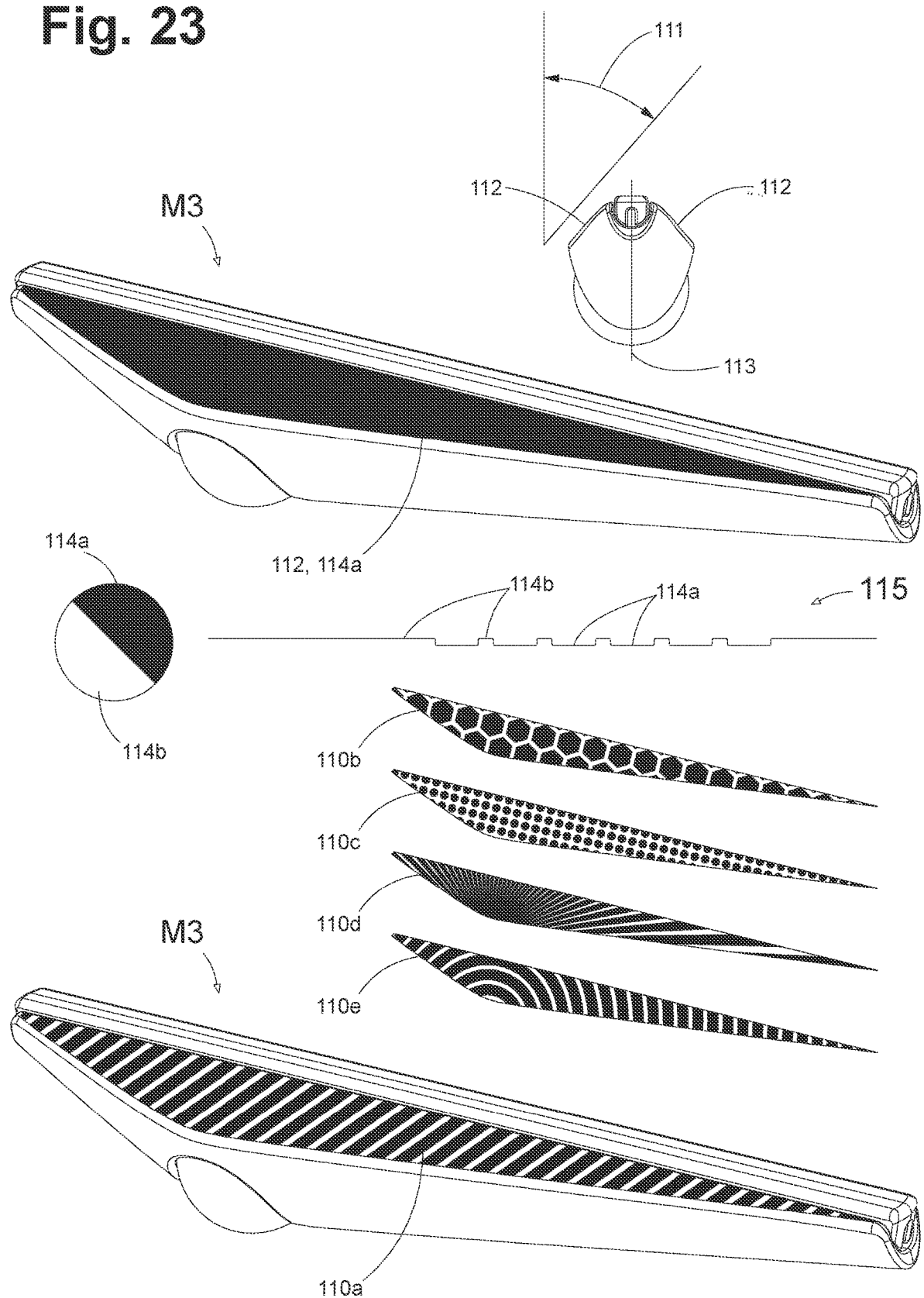
FIG. 23 shows an embodiment of the invention, and a complementary surface property that can protect glossiness on glossy parts of units.

Turning to FIG. 23, shown therein, an embodiment of the invention in a system M3, with special surface properties. The flat angled 111 surfaces 112 on each side of the symmetry line 113 provide the option to make a flat mirror-like reflectional finish, if made glossy 114a. The flat reflections would reflect sharp light far away under the right conditions. However, glossiness on especially plastic is very fragile. To overcome this problem, part of, or all the surfaces can be covered by different patterns, glossy 114a and matt 114b in finish. Different pattern areas 115 are raised and others are lowered. Glossy areas 114a of the patterns, are lowered in the surface, compared to the raised matt areas 114b. The raised areas will be more prone to scratching and overall wear, while the lowered glossy 114a areas stay protected and out of reach from mixed mechanical wear. The patterns can vary a lot from honeycomb 110b, to dots 110c, to rays 110d, to circles 110e, to lines 110a and so on infinitely. Depth and distance between the lowered and raised pattern boarders depend on the actual pattern, production technic, material, and design wishes. All versions of the invention could have the patterned, glossy, and matt surfaces anywhere, on any part, flat or curved.

Turning to FIG. 24, shown therein, an embodiment of the invention in a system M5e, that secures the system to stay on the line 3, preventing the line 3 from getting caught and "creeping" out between the first unit 2 and the second unit 4e. The line stays in place because the fit 94 between the first unit 2 and the second unit 4e is tight and precise and because the second unit 4e end "plate" 116 covers the first unit 2 end, only leaving a hole 117 slightly larger than a line, for the line to pass through. This combined with the lower ends 93 of the first unit 2 being covered by the higher ends 92 of the second unit 4e and the protruding end edge 99 of the second unit 4e over the end edge 98 of the first unit 2. Both ends in the longitudinal direction of the system M5e can overall be designed in the same way.

Turning to FIG. 25, shown therein, an embodiment of the invention in a system M5f, that secures the system to stay on the line 3, preventing the line 3 from getting caught and "creeping" out between the first unit 2f and the second unit 4f. The line stays in place because the fit 94 between the first unit 2f and the second unit 4f is tight and precise and because the second units 4f end "plate" 116 covers the first units 2f end, only leaving a hole 117 slightly larger than a line, for the line to pass through. This combined with the lower ends 93f of the first unit 2f being covered by the higher ends 92 of the second unit 4f and the protruding end edge 99 of the second unit 4f over the end edge 98 of the first unit 2f. Furthermore, part of the first unit 2f is extended in height so that its lower end 118 protrudes the body of the second unit 4f, in an opening 119 herein. This extension allows more travel 120 and more flexibility between the parts without the line getting caught and "creeping" out. Both ends in the longitudinal direction of the system M5f can overall be designed in the same way.

Figure 26:
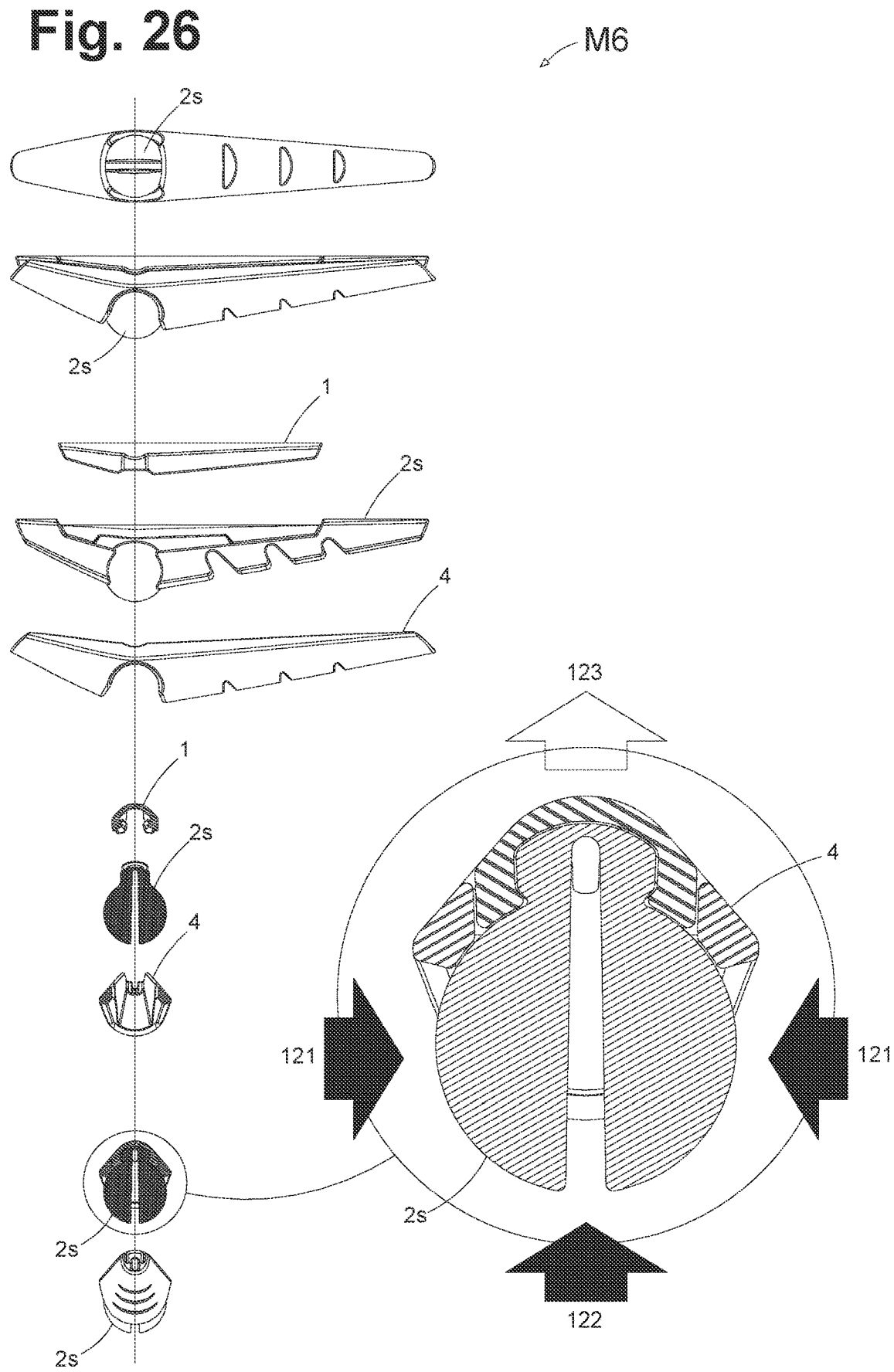
FIG. 26 shows an embodiment of the invention, where the snap coupling assembly is integrated with a first unit and how this unit fits a second unit.

Turning to FIG. 26, Shown therein, an embodiment of the invention in a system M6, assembled and disassembled, showing the upper back unit 1, a first unit 2s with locking mechanism, the line 3 and the second unit 4. The system M6 does not have a separate snap-lock unit. Instead, the locking mechanism is part of the first unit 2s. Unlocking the assembly is done by applying appropriate pressure on each side 121 of the half-ball-like mechanism while pushing up 122 towards the second unit 4 until the first unit 2s loosens 123. Assembly is done by simply pushing the parts together until a "snap" like sound is heard and a subtle jerk-motion is felt.

The snap coupling assembly, or in short, the snap-lock unit can appear on its own and in relationship with one or more units. It can have multiple functions where one is to attach and lock the selected units in place to assemble a system. Another function is to act as interchangeable weight and then again, a further function is to act as visual attractor, focus point or dot for predatory fish to aim at. The snap-lock unit plays a central role and is as such included in most versions of systems. However, the invention can exclude the snap-lock unit all together if a system is constructed in such a manner that at least two units are assembled and together form a part of an angling gear with an enclosure in which a line can be mounted so that the units can slide on the line in the longitudinal direction, and one of the units snaps into the other and locks them both together, until intended release by hand.

The units fitting the snap-lock unit, can vary in numbers, design, shape, and proportions. An example is a system made up of four units comprising a line-slider, a middle-section, or snap-on back, a main-body and a snap-lock unit. Complementary, interchangeable snap-on parts like spoon units can be added. A snap-on spoon can be made to fit all systems and variations, have various shapes, designs and sizes and be made in such a way that special movement patterns on retrieval or trolling can be achieved.

The invention allows the fisherman to bring a few units but still cover a very wide range of situations. A system as a lure can, with a fishing casting rod, be cast very far in tail- or headwind and retrieve fast or slow, deep, or low. The lure can run just beneath the surface, like a jerk bait or deep and hold the depth either as casting, trolling, jigging lure or in combination with at second system on the same line, but as dive-aid. It all depends on the rig setup, the way the lure is pointed on the line and what units are chosen and, or in combination with a spoon unit.

The invention allows for a modular interchangeable construction that can be assembled, disassembled, and altered without the use of tools. This enables the fisherman on the fishing spot, only with the use of his hands, to quick and easily change, enable, or alter appearance, weight, motion pattern and/or fishing style, with a system, a few units, and without tying a single new knot. A system itself behaves completely different just by turning it the opposite way on the line. Adding just a few extra units on the side will exponentially multiply the possibilities and give the fisherman a huge advantage in pinpointing that exact combo for that exact fishing situation at hand. If a system is made up by a set of four units, then adding one more interchangeable unit to the selection would double the combinations possible. Adding a set of four, gives a total of eight units and results in thirty two possible fishing combinations. An additional set of four gives twelve units and one hundred and twenty eight fishing combinations. Sixteen gives five hundred and twelve combinations. Twenty units or five sets of four gives two thousand and forty eight combinations. And so on. The mathematical function is $(4^n \times 2)=C$ where 4 is the number of units in one set, n is the number of additional sets, 2 is the two opposite fishing directions the system works in and C is the possible combinations that exists. Furthermore, one could argue that the possible combinations described here is only for the system as a fishing lure. Adding the possibilities of the system as a dive-aid or an attractor too would multiply the possible combinations again by a factor of 2, hence the formula $(4^n \times 2 \times 2)=C$.

The idea is for a fisherman to have a variety of lure, dive-aid and attractor systems or loose units in his pocket or small space and rapidly choose and assemble the exact right combo, all while staying fully focused on the situation, catching THAT fish. A system is relatively small, and so are the units comprising it, in most cases they have no hooks attached and requires very little space, making both systems and units perfect for keeping in pockets or small spaces.

The special locking features are achieved by a set of interchangeable units that will, with the right amount of pressure, snap together and lock one another. To change or disassemble the locked units the operation is done in the opposite order. To assemble or disassemble the set of units, force, in the form of pull or pressure, is applied at the exact right spots, in a given direction. A successful locking or unlocking makes a clear "snap" sound and tactile feedback. This is possible because of the interaction between the firm and non-flexible properties of the snap-lock unit and the firm, yet slightly flexible properties of the other units. One or more of the other units form a cavity the size and shape of the snap-lock unit, with an opening slightly smaller than the snap-lock unit, the units "snap" in and out relative to one another.

The special shape, weight distribution and material combination ensure long casting properties with a fishing casting rod, as well as the alluring swim motion on retrieval or trolling, deep, fast, or slow.

When a set of units are assembled making up a system, they stay locked despite casting, fish fighting and hard handling. Only when force is applied in a specific place, in the right direction, the right way, the system will come apart and disassemble into units.

A system can be slender, aero- and hydrodynamically shaped, and have a weight distribution between the units that can be easily customized to present custom casting and swim patterns.

As a lure one or more of the units can have holes or eyelets along the length of its body, or in either end, to mount clips, split-rings, swivel, hook, or line, or leader. Uke this the invention can act on its own, as a system, or in part united with other known lures to allow easy feature customization in any situation. An obvious feature would be if a unit, maybe a snap-lock unit, could increase or decrease the overall weight and motion pattern of a known lure.

In another embodiment of the invention one of the units can have a thin hole or groove running through its body longitudinal from one end to the other. This way the line can be threaded through the hole or groove and the system, can act as line through or line runner if intended as lure with a hook tied directly to the end of the line. The lure would be able to move freely up and down the line but stop at the end by the hook. The great advantage of this is that once a fish strikes the lure and the hook sets, the fish is much less likely to escape during the fight. The reason for this has to do with the fish's inability to throw the weight of the lure or use the lure as a means of leverage by rolling against it—in both cases to force the hook to loosen its grip.

In addition to the line through or line runner design, the line through the lure could be replaced with a special leader, with or without reinforcement, a metal wire, given a length long enough to allow the lure to run, or limit the length, to keep the lure from running. By limiting the length, adding eyelets or rings in either end of the wire, the lure would become more like conventional lures, that click straight on a standard bait clip setup and may thereby be better suited for some fishermen. A running lure with a leader of any kind requires more preparation and can for some fishermen seem tedious and unnecessary. It does however give several advantages preferred by many other fishermen. Both the running and the eyelets/rings version is completely possible within the scope of the invention.

In yet another embodiment of the invention at least two of the units can be made in such a way that they assemble around a line, creating an enclosure running through them longitudinal from one end to the other, to allow either running on the line, or clinging to the line without running. Such a design could allow the fisherman to speed up the process of changing lure, dive-aid, or attractor simply by avoiding cutting the line, threading line through small holes or tie new knots.

In another embodiment of the invention the ends of some of the units, enclosing the line, can be made in such a way that the line is less likely to wedge in between or even split the units apart. One approach is to shape the units in a way that one unit is smaller than the other and let one fit into the other. A bit like a hot dog sausage put in a bun; the sausage being the smaller unit would have a longitudinal groove in it, with the opening facing the bun, and the bun being the larger unit. One way to further eliminate the chance of the line wedging or splitting the units apart, beside a close fit between the units, is to make the smaller unit shorter or off the same length as the larger unit. The end edges of the smaller unit facing the larger unit can also be rounded so that the line does not have an edge or point that could introduce the wedging or splitting. Another way to further eliminate the wedging or splitting is to make the upper, smaller unit, the part with the groove for the line inside, sunken into the lower slightly wider and longer larger unit. The ends lower edges of the smaller unit are then covered by the larger unit all the way around. The deeper the lower end of the smaller unit rests in the larger unit, the better in place the line, and the harder it is for the line to wedge or split units apart. The specific design between units enclosing the line can take many forms, but the deeper the smaller unit rests in the larger one, the more flexing is possible between the units without the line wedging or splitting the units apart.

In another embodiment of the invention the unit or units in direct contact with the line could have one or more narrowings, making the unit or units stay on the line until it or they are forced off by hand. This can help the fisherman better handle the different units during system change or modification.

In another embodiment of the invention a heavy material snap-lock unit is placed in the lower region below the shortest straight path of a line at a place along the length of a system as a lure. This "hung" weight together with one or more units, made of lighter materials and with an aerodynamic shape, can give a long-range casting lure that can also perform very well in water. Depending on where along the length of the lure the snap-lock unit is placed, different swimming behaviors can be achieved during retrieval or trolling. A good balance is if the snap-lock unit is placed about ⅓-¼ along the length of the lure. If the lure is turned the opposite way and placed on the line, then the balance would be ⅔-¾ along the length of the lure.

Turning the lure with the weight closest to the hook at the end of the line (⅓-¼), enables the longest and smoothest casts, with a dive into water in a curved motion. Retrieval should be slow as the rear weight forces the back of the lure down and the front upwards in an angle and as a result, retrieval makes the lure seek surface even at slow retrieval. Faster retrieval breaks the surface and gives a very good indication of the optimal retrieval-speed for that given combination of units. The swimming behavior at slow retrieval is slightly wobbly, when faster, the lure starts swinging erratically from side to side until it breaks the surface or starts spinning when deep, if not slowed down. In most fishing situations, keeping the lure submerged is preferred, but breaking the surface can also provoke strikes from time to time. Especially if fish are difficult or if the aim is on particularly aggressive fish.

Having a system as a lure with the weight furthest away from the hook at the end of the line (⅔-¾) enables long casts with only a slight wiggle in the air and a dive into water, that quickly slows down as the weighted balance along with the resistance of the line, levels the lure horizontally straight while descending slowly, slightly wiggling. Retrieval can be slow to extremely fast because of the horizontal straight position in the water. Slow retrieval gives a close to straight path without much motion, but jerking the lure makes it seek to either side, up or down. Speeding up retrieval makes the lure seek and swim erratically while it stays close to a straight path. Even at extremely fast retrieval, the lure will stay beneath the surface.

A slim design, with a relatively large, snap-lock unit together with a relatively lightweight other unit and the line running through it does challenge the idea of a modular solution, directly interchangeable by hand. However, a challenge the invention accommodates. A durable transition between the front and the rear of a system with a slim design is especially challenging with common relatively lightweight materials, as the widest point of a system is usually right where the relatively large, snap-lock unit is located and where the lightweight unit has a large cavity. The use of excessive material in the width and height is not an option as this would widen the shape. Instead, the design must be slim, yet stiff enough to hold together and handle a transition between front and rear. A solution is to make the cavity partly wrap the relatively large, snap-lock unit and make the top sides of the unit, at the cavity, in a suitable angle on each side pointing towards each other along the center line on the back of the lightweight unit. From the widest point, both ends should taper into a pointy or near pointy shape. Thickness, wideness, length, volume, and size could all vary to tailor specific fishing needs.

All units are to be made of hard, durable, nonbrittle materials such as composites, plastic, metal, glass, or ceramics. Producing the invention in durable full colored or dyed materials renders conventional spray painting unnecessary. When a single-colored unit is combined with other single-colored units, the fisherman will have the option of customizing the lure, with more than one color. Parameters like transparency, gloss or surface patterns from the material compound and production method can further aid diversity and visual appeal. Avoiding the often labor-intensive process of manually spray painting or stamping graphical details onto the lure takes away the advantages of producing the invention in less developed countries. The invention is not limited by specific production methods thus, it can be 3D-printed, processed by milling or lathe, casted or produced with a combination of technics. However, the most cost-effective production method in mass production is injection molding, as it produces a uniform result with the option of various surface finishes, the option of tiny details and it allows the use of modern plastics, minerals, synthetics, or biodegradable materials. Transparent or semi-transparent materials in various colors, combined with various material thicknesses and a layered, modular design, offer numerous possibilities within colors of each unit. In addition, a range of whole new mixed colors can appear when light interact with the differently colored units. Colors can be ever changing depending on viewing-angle, light-intensity, and varied wall thicknesses of the units combined.

A snap-lock unit can be rounded, have edges, be with or without a shaft or collar, be spherical, have the shape of a ball, a cube, or any compact positive shape, that would fit into a corresponding cavity in one or more units within the same congruent size and form-type.

In another embodiment of the invention, the angled top sides on the opposite side of the snap-lock unit's cavity can be leveled and mirror-like glossy in the surface finish. This would reflect focused rays of sunlight at great distances raising visibility and encourage fish to strike at an even higher rate.

In another embodiment of the invention one or more of the units can be produced with a special surface finish that protects glossy parts from scratching during use and handling. The surface finish can be made by preparing the inside surfaces of the mold. The image or surface finish on the inside of the mold will directly translate to the same opposite image or surface finish on a unit. By recessing the glossy details into grooves and raising the matt details the surface finish can appear and stay glossy for much longer than with a flat design, and without the need for clear coating. This technic is widely used in many consumer products but using it for fishing lures to keep glossiness glossy is new.

In another embodiment of the invention, special snap-on units can modify or completely change the appearance and behavior of a system. Snap-on can happen from either end, to the widest part of a system. One type of snap-on units are different shapes, sizes and angles of lips and spoons that can make a system wobble, dive, or behave very differently and even in an erratic manner while on retrieval or trolling.

Aspects:
1. A system for angling, said system comprising, at least a first unit and a second unit, which when assembled forms a part of an angling gear with an enclosure in which a line can be mounted in such a way that the units can slide on the line in the longitudinal direction of the line, characterized by,
   the first unit comprises a groove in which the line can be laid
   the second unit comprises a portion made complementary to the groove such that the enclosure is created when the first and the second units are assembled,
   a releasable snap coupling assembly that can lock the first and the second units together.
2. A system for angling according to aspect 1 comprising a plurality of mutually interchangeable first units.
3. A system for angling according to aspect 1 or 2 comprising a plurality of mutually interchangeable second units
4. A system for angling according to any of the aspects 1-3 wherein, the releasable snap coupling assembly (-ies) is an integrated part of the first unit (-s) or an integrated part of the second unit (-s).
5. A system for angling according to any of the aspects 1-3 comprising a plurality of mutually interchangeable snap coupling assemblies
6. A system for angling according to any of the aspects 1-5, wherein the releasable snap coupling assembly comprises a spherical locking unit which can be snapped into releasable engagement with the first unit and/or the second unit and thereby lock the first and the second units together.
7. A system for angling according to any of the aspects 1-5 and aspect 6 when dependent on aspect 5 wherein the system comprises at least two mutually interchangeable spherical locking units.
8. A system for angling according to aspect 7 comprising at least two mutually interchangeable spherical locking units of different mass.
9. A system for angling, said system comprising, at least a first unit and a second unit, which when assembled forms a part of an angling gear with an enclosure in which a line can be mounted in such a way that the units can slide on the line in the longitudinal direction of the line, characterized by,
   the first unit comprises an enclosure in which the line can be laid;
   the second unit is made complementary to the first unit such that the first and the second units can be assembled;
   a releasable snap coupling assembly that can lock the first and the second units together.
10. A system for angling according to aspect 9 comprising a plurality of mutually interchangeable first units.
11. A system for angling according to aspect 9 or 10 comprising a plurality of mutually interchangeable second units
12. A system for angling according to any of the aspects 9-11 wherein, the releasable snap coupling assembly (-ies) is an integrated part of the first unit (-s) or an integrated part of the second unit (-s).
13. A system for angling according to any of the aspects 9-11 comprising a plurality of mutually interchangeable snap coupling assemblies
14. A system for angling according to any of the aspects 9-13, wherein the releasable snap coupling assembly comprises a spherical locking unit which can be snapped into releasable engagement with the first unit and/or the second unit and thereby lock the first and the second units together.
15. A system for angling according to any of the aspects 9-13 and aspect 14 when dependent on aspect 13 comprising at least two mutually interchangeable spherical locking units.
16. A system for angling according to aspect 15 comprising at least two mutually interchangeable spherical locking units of different mass.
17. A system for angling, said system comprising, at least a first unit and a second unit, which when assembled forms a part of an angling gear, characterized by, said system comprising, a releasable snap coupling assembly that can lock the first and the second units together.
18. A system for angling according to aspect 17 comprising a plurality of mutually interchangeable first units.
19. A system for angling according to aspect 17 or 18 comprising a plurality of mutually interchangeable second units
20. A system for angling according to any of the aspects 17-19 wherein, the releasable snap coupling assembly (-ies) is the first unit (-s) or the second unit (-s).

21. A system for angling according to any of the aspects 17-20 wherein, the releasable snap coupling assembly (-ies) is a spherical locking unit (-s).

The invention claimed is:

1. A system for angling, comprising:
   at least one first unit;
   at least one second unit; and
   a releasable snap coupling assembly for locking the at least one first unit and the at least one second unit together to form part of an angling gear,
   wherein the releasable snap coupling assembly comprises a locking unit which is removably coupled to the at least one first unit and the at least one second unit,
   wherein the part of the angling gear formed by the at least one first unit and the at least one second unit locked together defines a gap for releasably receiving the locking unit, and
   wherein removal of the locking unit from the gap unlocks the at least one first unit from the at least one second unit.

2. The system for angling according to claim 1, wherein the at least one first unit comprises a plurality of mutually interchangeable first units.

3. The system for angling according to claim 2, wherein the at least one second unit comprises a plurality of mutually interchangeable second units.

4. The system for angling according to claim 1, wherein the locking unit is a spherical locking unit.

5. The system for angling according to claim 1, wherein the part of the angling gear comprises an enclosure configured such that a line can be mounted therein, such that the at least one first unit and the at least one second unit can slide on the line in a longitudinal direction of the line, the at least one first unit comprising a groove in which the line can be laid, and the at least one second unit comprising a portion which is complementary to the groove such that the enclosure is defined by the at least one first unit and the at least one second unit being assembled together using the releasable snap coupling assembly.

6. The system for angling according to claim 1, wherein the part of the angling gear comprises an enclosure configured such that a line can be mounted therein, such that the at least one first unit and the at least one second unit can slide on the line in a longitudinal direction of the line, the at least one first unit defining the enclosure and being configured such that the line can be laid therein, and wherein the at least one second unit is complementary to the at least one first unit such that the at least one first unit and the at least one second unit can be assembled together using the releasable snap coupling assembly.

7. The system for angling according to claim 1, further comprising at least one additional locking unit, wherein the locking unit and the at least one additional locking unit each comprise a spherical locking unit, the locking unit and the at least one additional locking unit being selectively interchangeable and having different masses with respect to one another.

8. The system for angling according to claim 1, further comprising a spoon releasably mounted on the part of the angling gear.

9. The system for angling according to claim 8, wherein the spoon is releasably locked to the part of the angling gear by the locking unit.

\* \* \* \* \*